US008972846B2

(12) United States Patent
Lessing et al.

(10) Patent No.: US 8,972,846 B2
(45) Date of Patent: Mar. 3, 2015

(54) MALTWEB MULTI-AXIS VIEWING INTERFACE AND HIGHER LEVEL SCOPING

(75) Inventors: Abha Lessing, Randwick (AU);
Christophe Schnelle, Randwick (AU);
Paul William Leslie, Earlwood (AU);
Geoffrey John Nolan, Lane Cove (AU)

(73) Assignee: Timebase Pty Limited, Sydney NSW (AU)

( * ) Notice: Subject to any disclaimer, the term of this patent is extended or adjusted under 35 U.S.C. 154(b) by 1675 days.

(21) Appl. No.: 11/600,785

(22) Filed: Nov. 17, 2006

(65) Prior Publication Data

US 2007/0067715 A1    Mar. 22, 2007

Related U.S. Application Data

(63) Continuation of application No. 09/689,927, filed on Oct. 12, 2000, now Pat. No. 7,293,228, which is a continuation-in-part of application No. 09/108,999, filed on Jul. 1, 1998, now Pat. No. 6,233,592, which is a continuation of application No. PCT/AU98/00050, filed on Jan. 30, 1998, now abandoned.

(30) Foreign Application Priority Data

Jan. 31, 1997    (AU) ..................................... PO4892

(51) Int. Cl.
*G06F 17/00* (2006.01)
*G06F 17/22* (2006.01)
(Continued)

(52) U.S. Cl.
CPC ...... *G06F 17/2288* (2013.01); *G06F 17/30994* (2013.01); *G06F 17/2229* (2013.01); *G06F 17/21* (2013.01); *G06F 17/30014* (2013.01)
USPC ........................... 715/229; 715/853; 715/854

(58) Field of Classification Search
CPC .......... G06F 3/04815; G06F 17/30994; G06F 17/2288; G06F 17/2247; G06F 17/30011; G06F 17/2211; G06F 17/2229
USPC ......... 715/200, 209, 229, 273, 277, 854, 855, 715/850
See application file for complete search history.

(56) References Cited

U.S. PATENT DOCUMENTS 4,558,413 A    12/1985 Schmidt et al.
4,627,019 A    12/1986 Ng
(Continued)

FOREIGN PATENT DOCUMENTS

WO    97/15890    5/1997
WO    98/34179    8/1998

OTHER PUBLICATIONS

"Cyclic cvsweb page", Cyclic Software, Archive Jan. 27, 1998 http://www.cyclic.com/cyclic-pages/web-cvsweb.html.*
(Continued)

*Primary Examiner* — Adam M Queler
(74) *Attorney, Agent, or Firm* — Clifford H. Kraft

(57) ABSTRACT

A method, apparatus and computer program product for navigating in a multidimensional space containing an electronic publication formed from predefined portions of text-based data encoded using a markup language are disclosed. A selected predefined portion is displayed in a first display region. A point on a primary axis of the multidimensional space corresponding to the displayed pre-defined portion is also displayed. Also, a method, apparatus and computer program product for publishing an electronic publication formed from predefined portions of text-based data encoded using a markup language are also disclosed. Predefined portions are stored in terminal nodes. Higher level nodes are provided for organizing the terminal nodes into an hierarchical structure embodied in said electronic publication. Each higher level node contains the identity of a parent node, a position indicator for the higher level node and an associated identifier.

18 Claims, 8 Drawing Sheets

(51) Int. Cl.
*G06F 17/30* (2006.01)
*G06F 17/21* (2006.01)

(56) References Cited

U.S. PATENT DOCUMENTS

| | | | |
|---|---|---|---|
| 4,714,992 A | | 12/1987 | Gladney et al. |
| 4,853,843 A | | 8/1989 | Ecklund |
| 4,875,159 A | | 10/1989 | Cary et al. |
| 4,914,590 A | * | 4/1990 | Loatman et al. ............ 704/8 |
| 5,148,154 A | | 9/1992 | MacKay et al. |
| 5,193,185 A | | 3/1993 | Lanter |
| 5,287,496 A | | 2/1994 | Chen et al. |
| 5,302,660 A | | 4/1994 | Klinksiek et al. |
| 5,307,456 A | | 4/1994 | MacKay |
| 5,355,472 A | | 10/1994 | Lewis |
| 5,440,730 A | | 8/1995 | Elmasri |
| 5,671,428 A | | 9/1997 | Muranaga et al. |
| 5,732,257 A | | 3/1998 | Atkinson et al. |
| 5,740,425 A | | 4/1998 | Povilus |
| 5,767,854 A | | 6/1998 | Anwar |
| 5,786,814 A | * | 7/1998 | Moran et al. ............ 715/720 |
| 5,801,702 A | * | 9/1998 | Dolan et al. ............ 715/854 |
| 5,831,617 A | * | 11/1998 | Bhukhanwala ............ 715/839 |
| 5,835,087 A | | 11/1998 | Herz et al. |
| 5,877,766 A | * | 3/1999 | Bates et al. ............ 715/854 |
| 5,892,513 A | | 4/1999 | Fay |
| 5,893,908 A | * | 4/1999 | Cullen et al. ............ 1/1 |
| 5,935,210 A | | 8/1999 | Stark |
| 5,963,208 A | | 10/1999 | Dolan et al. |
| 6,026,388 A | | 2/2000 | Liddy et al. |
| 6,031,537 A | * | 2/2000 | Hugh ............ 715/854 |
| 6,047,126 A | | 4/2000 | Imai |
| 6,061,697 A | | 5/2000 | Nakao |
| 6,078,934 A | | 6/2000 | Lahey et al. |
| 6,144,962 A | | 11/2000 | Weinberg et al. |
| 6,154,213 A | * | 11/2000 | Rennison et al. ............ 715/854 |
| 6,185,576 B1 | | 2/2001 | McIntosh |
| 6,189,019 B1 | | 2/2001 | Blumer et al. |
| 6,204,850 B1 | * | 3/2001 | Green ............ 715/850 |
| 6,233,592 B1 | | 5/2001 | Schnelle et al. |
| 6,366,933 B1 | | 4/2002 | Ball et al. |
| 6,421,656 B1 | | 7/2002 | Cheng et al. |
| 6,470,490 B1 | | 10/2002 | Hansen |
| 6,502,101 B1 | | 12/2002 | Verprauskus et al. |
| 6,505,191 B1 | | 1/2003 | Baclawski |
| 6,529,905 B1 | | 3/2003 | Bray et al. |
| 6,542,911 B2 | | 4/2003 | Chakraborty et al. |
| 6,581,062 B1 | | 6/2003 | Draper et al. |
| 6,584,459 B1 | | 6/2003 | Chang et al. |
| 6,584,480 B1 | | 6/2003 | Ferrel et al. |
| 6,601,065 B1 | | 7/2003 | Nelson et al. |
| 6,606,653 B1 | | 8/2003 | Ackermann et al. |
| 6,636,845 B2 | | 10/2003 | Chau et al. |
| 6,643,633 B2 | | 11/2003 | Chau et al. |
| 6,708,186 B1 | | 3/2004 | Claborn et al. |
| 6,708,214 B1 | | 3/2004 | La Fleur |
| 6,721,727 B2 | | 4/2004 | Chau et al. |
| 6,772,139 B1 | | 8/2004 | Smith, III |
| 6,823,495 B1 | | 11/2004 | Vedula et al. |
| 6,826,726 B2 | | 11/2004 | Hsing et al. |
| 6,832,219 B2 | | 12/2004 | Lal |
| 6,836,778 B2 | | 12/2004 | Manikutty et al. |
| 6,853,997 B2 | | 2/2005 | Wotring et al. |
| 6,886,005 B2 | | 4/2005 | Davis |
| 6,934,712 B2 | | 8/2005 | Kiernan |
| 6,944,817 B1 | | 9/2005 | Danneels |
| 6,950,913 B2 | | 9/2005 | Glasco |
| 7,028,147 B2 | | 4/2006 | Wu et al. |
| 7,075,536 B2 | | 7/2006 | Goldschmidt |
| 7,293,228 B1 | | 11/2007 | Lessing et al. |
| 7,376,674 B2 | | 5/2008 | Lastovica |
| 7,412,535 B2 | | 8/2008 | Agarwalla et al. |
| 7,526,479 B2 | | 4/2009 | Zenz |
| 2001/0037345 A1 | | 11/2001 | Kiernan et al. |
| 2001/0047372 A1 | | 11/2001 | Gorelik et al. |
| 2002/0010700 A1 | | 1/2002 | Wotring et al. |
| 2002/0010711 A1 | | 1/2002 | Nakanishi et al. |
| 2002/0023091 A1 | | 2/2002 | Silberberg et al. |
| 2002/0116371 A1 | | 8/2002 | Dodds et al. |
| 2002/0120630 A1 | | 8/2002 | Christianson et al. |
| 2002/0129052 A1 | | 9/2002 | Glazer et al. |
| 2002/0133484 A1 | | 9/2002 | Chau et al. |
| 2002/0133497 A1 | | 9/2002 | Draper et al. |
| 2002/0156811 A1 | | 10/2002 | Krupa |
| 2002/0169788 A1 | | 11/2002 | Lee et al. |
| 2002/0194357 A1 | | 12/2002 | Harris et al. |
| 2003/0023754 A1 | | 1/2003 | Eichstadt et al. |
| 2003/0041305 A1 | | 2/2003 | Schnelle et al. |
| 2003/0070144 A1 | | 4/2003 | Schnelle et al. |
| 2003/0140308 A1 | | 7/2003 | Murthy et al. |
| 2003/0167420 A1 | | 9/2003 | Parsons |
| 2003/0167456 A1 | | 9/2003 | Sabharwal |
| 2003/0177443 A1 | | 9/2003 | Schnelle et al. |
| 2003/0226108 A1 | | 12/2003 | Oezgen |
| 2004/0093469 A1 | | 5/2004 | Glasco |
| 2004/0139327 A1 | | 7/2004 | Brown et al. |
| 2004/0162807 A1 | | 8/2004 | Montagne |
| 2004/0220927 A1 | | 11/2004 | Murthy et al. |
| 2005/0039109 A1 | | 2/2005 | Schumacher et al. |
| 2005/0171946 A1 | | 8/2005 | Maim |
| 2007/0174541 A1 | | 7/2007 | Chandrasekaran et al. |
| 2007/0192246 A1 | | 8/2007 | Futamase |
| 2007/0288890 A1 | | 12/2007 | Wells |

OTHER PUBLICATIONS

Fenner, William, cvsweb (C) 1996 http://web.archive.org/web/19991007082542/http://www.freebsd.org/%7Efenner/cvsweb/cvsweb-1.0.tar.gz, cvsweb.*
Fenner, William C., "cvsweb 1.0" Sep. 19, 1996 http://web.archive.org/web/19991007082542/http://www.freebsd.org/%7Efenner/cvsweb/cvsweb-1.0.tar.gz Archived 10/07/199 by archive.org.*
Morrison Michael et al. XML Unleashed, Sam's Publishing Indianapolis, IN, Dec. 1999, pp. 398-415, 482-489, 506-507 and 518-519.
"DB2 Universal database XML extender: Web-enabling you Data with XML", IBM product information sheet 200, 2 pages.
Baru, Chaitanya, "Xviews: VML Views of Relational Schemas" San Diego Supercomputer Center Technical Report, SDSC TR-100-3, Oct. 1999, 18 pages.
Sturm, Jake Developing XML Solutions, Microsoft Press, Redmond, WA 2000, pp. 287-289, 347-348 and 359-366.
Harold, Elliotte Rusty, XML: Extesible Markup Language, IDG Boks Worldwide. Inc., Foster City 1198, pp. 32-39, 57-59, 66-70 and 96-99.
DeRose, W3C: XML Linking Language XLink, Dec. 20, 2000, W3C, Version 1.0, pp. 1-27.
Arnold-Moore, Timothy and Sacks-Davis, Ron; Databases of Legislation: the Problems of Consolidations, Collaborative Information Technology Research Institute, May 15, 1994.
Freeman, Simon and Callum, Euan; A Brief History of Time Travel; Legal Information Management 4 (2004) pp. 28-30.
http://www.xml.com/pub/a/2001/06/20/databases.html.
http://www.sweetandmaxwell.co.uk/westlaw/pdfs/user_guide.pdf.
http://www.sweetandmaxwell.co.uk/about/history.html.
http://www.complinet.com/home/about.
http://www.sweetandmaxwell.co.uk/westlaw/about.htm.
http://www.butterworths.com/about/index.htm.
http://www.complinet.com/home/share/pdf/news_rules/uk/companylaw_NR_insert.pdf.
http://www.complinet.com/home/news_rules/.
http://www.pendragon.co.uk/perspective.
http://www.pendragon.co.uk/perspective/perspective2.htm.
http://www.pendragon.co.uk/perspective/perspective3.htm.
Adrenne Azaria "SGML: A lifesaver in a Sea of Electronic Documents." Network World 11/50, Dec. 12, 1994.
Legal Database program entitled Status utilizing Folio Bound Views, Pub 1994.
ActiveTEXT Datasheet, available at: http://web.archive.org/web/19970630042435/www.ais.co.uk/atds.html, 1997.

(56) References Cited

OTHER PUBLICATIONS

Arnold-Moore et al. "Connected to the Law: Tasmanian Legislation Using EnAct", InQuirion Pty Ltd., 2002.
Arnold-Moore et al. "Models for Structured Document Database Systems", Royal Melbourne Institute of Technology, 1998.
Arnold-Moore, "Automatic Generation of Amendment Legislation", ACM 1997.
Arnold-Moore, "Automatically, Processing Amendments to Legislation", ACM 1995.
Berners, uniform Resource Identifiers (URI): Generic Syntax, Aug. 1998, RFC 2396, pp. 1-41.
Communication from Applicant Responsive to Jul. 25, 2002 Search Report in EP 98901249.7, Oct. 1, 2002.
Communication from Applicant Responsive to Sep. 8, 2005 Communication in EP 98901249.7, Sep. 19, 2005.
Communication from Applicant Responsive to Jan. 25, 2007 Communication in EP 98901249.7, Apr. 5, 2007.
Communication from Applicant Responsive to Apr. 23, 2007 Communication in EP 98901249.7, Jun. 25, 2007.
Davis, "Hypertext Link Integrity", Dec. 1999, pp. 1-6.
DeRose et al., XML XLink Requirements Verision 1.0, Feb. 1999, W3C, pp. 1-15.
Ducharme, "Links that are More Valuable than the Information they Link", Jul. 25, 1998, xml.com pp. 1-3.
Duhig, "Separating Links Content using XML, Xlink and Xpointer", May 2001, Internationanales Congress Centrum (ICC), pp. 1-19.
Eckhert, "Processing Hypertext Links after Xlink", 2004, pp. 1-58.
Fong et al. "Converting Relational Databases into XML Document", IEEE 2001, pp. 61-65.
Jan. 18, 2007 letter enclosing website entitled "The Information Society Creative Awards 1996", available at: http://met.open.ac.uk/isca/, 1996.
Hyper Media Database.
Jan. 19, 2007 letter in response to Jan. 18, 2007 letter enclosing website entitled "The Information Society Creative Awards 1996", available at: http://met.open.ac.uk/isca/, 1996.
Khan et al., "A performance Evaluation of Storing XML Data in Relational Database Management Systems", ACM 2001, pp. 31-38.
Lowe et al. "Improving Web Linking Using Xlink", Jul. 2001, pp. 1-19.
Maioli C. et al., "Versioning Issues in a Collaborative Distributed Hypertext System" Technical Report Universita Di Bologna, Apr. 1993.
Maler, "XML and Broken Links (How can the XML Pointer Language, Xlink and Xpointer help solve the problem of Broken Links of the Net?", Mar. 1998 p. 1.
McFall et al. "Automaticall Finding and Repairing Broken Lings Between XML Documents" Dec. 1998, Department of Computer Science, Michigan State University, pp. 1-18.
Nambiar et al., "Current Approaches to XML Management", IEEE 2002, pp. 43-51.
Office Action of Corresponding European Appl. No. 98 901 249.7-1527, Jan. 28, 2005.
Office Action of Corresponding European Appl. No. 98 901 249.7-1527, Jan. 25, 2007.
Office Action of Corresponding European Appl. No. 98 901 249.7-1527, Feb. 27, 2008.
Order Granting Reexamination Request from US Patent No. 6,233,592, Apr. 3, 2007.
Reexamination Request from US Patent No. 6,233,592; Jan. 29, 2007.
Sacks-Davis et al. "Database Systems for Structured Documents", International Symposium on Advanced Database Technologies and Their Integration, Japan, 1994.
Sacks-Davis et al., "A Standards-Based Approach to Combining Information Retrieval and Database Functionality", International Journal of information Technology, 1(1):1-15, 1995.
Shanmugasundaram et al., "Efficiently Publishing Relational Data as XML Documents", Google Apr. 2001, pp. 133-154.
Simpson, "Top Ten Tips to Using Xpath and Xpointer", Aug. 21, 2002, xml.com, pp. 1-12.
Third Party Observation Under Article 115 EPC filed Apr. 18, 2007 in EP 98901429.7.
Third Party Observation Under Article 115 EPC filed Nov. 23, 2006 in EP 98901429.7.
Wang, Wen Qiang et al., "XstorM: A Scalable Mapping Scheme for XML Data", World Wide Web, vol. 4, Nos. 1-2, Mar. 2001, pp. 101-119.
WR Communication pursuant to Article 115(c) and responsive to "WR Communication pursuant to Article 115(c) EPC, Nov. 30, 2006" EPC, Jan. 26, 2007.
XML—Sitemaps, Find and Fix Broken Links, 2005-2008, XML—Sitemaps, pp. 1-8.
Xsoft Astoria—http://www.architag.com/tag/Article.asp?v=10&i=4&p=8&s=1.
Xsoft Premieres Astoria: A simpler way to mange "Mega-Documents" dated Mar. 12, 1996, 1996—http://www.highbeam.com/doc/1G1-18079234.html.
Xsoft, A division of Xerox updated Jul. 12, 1006—http://xml.coverpages.org/duCharme-sgmldbms.html.
Zhu, Yan et al., "Data Transformation for Warehousing Web Data", WECWIS, Jun. 21-22, 2001, pp. 74-85.
Rule 26(f) Report dated Jun. 21, 2007 for *Timebase Pty Ltd.* v. *The Thomson Corp.*, Case No. 07 CV 1687 (D. Minn.).
Electronic Discovery Protocol filed with Rule 26(f) Report dated Jun. 21, 2007 for *Timebase Pty Ltd.* v. *The Thomson Corp.*, Case No. 07 CV 1687 (D. Minn.).
Plaintiff's Proposed Protective Order filed with Rule 26(f) Report dated Jun. 21, 2007 for *Timebase Pty Ltd.* v. *The Thomson Corp.*, Case No. 07 CV 1687 (D. Minn.).
Defendant's Proposed Protective Order filed with Rule 26(f) Report dated Jun. 21, 2007 for *Timebase Pty Ltd.* v. *The Thomson Corp.*, Case No. 07 CV 1687 (D. Minn.).
Transcript of Proceedings filed Feb. 26, 2008 for *Timebase Pty Ltd.* v. *The Thomson Corp.*, Case No. 07 CV 1687 (D. Minn.).
Letter from Grey Plant & Moody dated Jun. 1, 2007 for *Timebase Pty Ltd.* v. *The Thomson Corp.*, Case No. 07 CV 1687 (D. Minn.).
Letter from Niro, Scavone, Haller & Niro dated Dec. 21, 2007 for *Timebase Pty Ltd.* v. *The Thomson Corp.*, Case No. 07 CV 1687 (D. Minn.).
Letter from Faegre and Benson dated Dec. 20, 2007 for *Timebase Pty Ltd.* v. *The Thomson Corp.*, Case No. 07 CV 1687 (D. Minn.).
Letter from Faegre and Benson dated Apr. 1, 2008 for *Timebase Pty Ltd.* v. *The Thomson Corp.*, Case No. 07 CV 1687 (D. Minn.).
Letter from Niro, Scavone, Haller & Niro dated Apr. 17, 2008 for *Timebase Pty Ltd.* v. *The Thomson Corp.*, Case No. 07 CV 1687 (D. Minn.).
Motion to Stay Litigation Pending Reexamination Proceedings dated Jun. 14, 2007 for *Timebase Pty Ltd.* v. *The Thomson Corp.*, Case No. 07 CV 1687 (D. Minn.).
Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 1 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 2 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 3 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 4 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

(56) References Cited

OTHER PUBLICATIONS

Exhibit 5 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 6 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 7 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 8 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Exhibit 9 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).
Timebase's Response to Thompson's Motion to Stay dated Jun. 21, 2007 for *Timebase Pty Ltd.* v. *The Thomson Corp.*, Case No. 07 CV 1687 (D. Minn.).
Exhibit A for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit B for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit C for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit D for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit E for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit F for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit G for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit H for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit I for Timebase's Response to Thompson's Motion to Stay dated Jun. 21, 2007 for *Timebase Pty Ltd.* v. *The Thomson Corp.*, Case No. 07 CV 1687 (D. Minn.).
Exhibit J for Timebase's Response to Thompson's Motion to Stay dated Jun. 21, 2007 for *Timebase Pty Ltd.* v. *The Thomson Corp.*, Case No. 07 CV 1687 (D. Minn.).
Order dated Feb. 7, 2008 for *Timebase Pty Ltd.* v. *The Thomson Corp.*, Case No. 07 CV 1687 (D. Minn.).
Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 1 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 2 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 3 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 4 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 5 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 6 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Exhibit 7 for Index to Exhibits for Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 1687 (D. Minn.).
Complaint dated Jan. 24, 2007 for *Timebase Pty Ltd.* v. *The Thomson Corp.*, Case No. 07 CV 1687 (D. Minn.).
Document 19-3 Complaint dated Mar. 28, 2007 for *Timebase Pty Ltd.* v. *The Thomson Corp.*, Case No. 07 CV 1687 (D. Minn.).
Plaintiff's Motion for Leave to Serve and File Amended Complaint dated May 10, 2007 for *Timebase Pty Ltd.* v. *The Thomson Corp.*, Case No. 07 CV 1687 (D. Minn.).
Exhibit A Amended Complaint dated May 10, 2007 for *Timebase Pty Ltd.* v. *The Thomson Corp.*, Case No. 07 CV 1687 (D. Minn.).
Plaintiff's Memorandum in Support of Motion for Leave to Serve and File Amended Complaint dated May 10, 2007 for *Timebase Pty Ltd.* v. *The Thomson Corp.*, Case No. 07 CV 1687 (D. Minn.).
Stipulation to Plaintiff's Amended Complaint dated Jun. 1, 2007 for *Timebase Pty Ltd.* v. *The Thomson Corp.*, Case No. 07 CV 1687 (D. Minn.).
Order dated Jun. 6, 2007 for *Timebase Pty Ltd.* v. *The Thomson Corp.*, Case No. 07 CV 1687 (D. Minn.).
Amended Complaint dated Jun. 18, 2007 for *Timebase Pty Ltd.* v. *The Thomson Corp.*, Case No. 07 CV 1687 (D. Minn.).
Defendants' Joint Answer and Defenses to Plaintiff's Amended Complaint dated Jun. 18, 2007 for *Timebase Pty Ltd.* v. *The Thomson Corp.*, Case No. 07 CV 1687 (D. Minn.).
Notice of Motion dated Feb. 9, 2007 for *Timebase Pty Ltd.* v. *The Thomson Corp.*, Case No. 07 CV 1687 (D. Minn.).
Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Declaration of Andrew Martens dated Feb. 9, 2007 for *Timebase Pty Ltd.* v. *The Thomson Corp.*, Case No. 07 CV 1687 (D. Minn.).
Declaration of Chad Drown dated Feb. 9, 2007 for *Timebase Pty Ltd.* v. *The Thomson Corp.*, Case No. 07 CV 1687 (D. Minn.).
Exhibits A-D for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Exhibits E-H for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).

(56) References Cited

OTHER PUBLICATIONS

Exhibit I for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).
Timebase's Response to The Thompson Corporation's Motion to Transfer dated Feb. 26, 2007 for *Timebase Pty Ltd.* v. *The Thomson Corp.*, Case No. 07 CV 1687 (D. Minn.).
Exhibits 1-5 for Timebase's Response to The Thompson Corporation's Motion to Transfer dated Feb. 26, 2007 for *Timebase Pty Ltd.* v. *The Thomson Corp.*, Case No. 07 CV 1687 (D. Minn.).
Defendant Thompson Corporation's Reply Brief in Support of its Motion to Transfer Venue to the District of Minnesota and for a More Definite Statement dated Mar. 5, 2007 for *Timebase Pty Ltd.* v. *The Thomson Corp.*, Case No. 07 CV 1687 (D. Minn.).
Second Declaration of Andrew Martens dated Mar. 5, 2007 for *Timebase Pty Ltd.* v. *The Thomson Corp.*, Case No. 07 CV 1687 (D. Minn.).
Certificate of Service dated Mar. 5, 2007 for *Timebase Pty Ltd.* v. *The Thomson Corp.*, Case No. 07 CV 1687 (D. Minn.).
Court Docket Entry dated Mar. 9, 2007 for *Timebase Pty Ltd.* v. *The Thomson Corp.*, Case No. 07 CV 1687 (D. Minn.).
Memoranum Opinion and Order dated Mar. 9, 2007 for *Timebase Pty Ltd.* v. *The Thomson Corp.*, Case No. 07 CV 1687 (D. Minn.).
Document 19-1 Memorandum Opinion and Order dated Mar. 28, 2007 for *Timebase Pty Ltd.* v. *The Thomson Corp.*, Case No. 07 CV 1687 (D. Minn.).
Cover Letter for Transfer of Case dated Mar. 26, 2007 for *Timebase Pty Ltd.* v. *The Thomson Corp.*, Case No. 07 CV 1687 (D. Minn.).
Rule 26(f) Report (Patent Cases) for *Timebase Pty Ltd.* v. *The Thomson Corp.*, Case No. 07 CV 4551 (D. Minn.).
Timebase's First Set of Requests for the Production of Documents (Nos. 1-40) to The Thompson Corporation dated Mar. 3, 2008 for *Timebase Pty Ltd.* v. *The Thomson Corp.*, Case No. 07 CV 4551 (D. Minn.).
Timebase's First Set of Requests for the Production of Documents (Nos. 1-40) to West Publishing Corporation dated Mar. 3, 2008 for *Timebase Pty Ltd.* v. *The Thomson Corp.*, Case No. 07 CV 4551 (D. Minn.).
Timebase's First Set of Requests for the Production of Documents (Nos. 1-40) to West Services Inc. dated Mar. 3, 2008 for *Timebase Pty Ltd.* v. *The Thomson Corp.*, Case No. 07 CV 4551 (D. Minn.).
Defendant The Thompson Corporation's Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
Defendants' First Set of Requests for Production of Documents and Things to Plaintiff Timebase Pty Ltd. dated Apr. 3, 2008 for *Timebase Pty Ltd.* v. *The Thomson Corp.*, Case No. 07 CV 4551 (D. Minn.).
Defendant Thompson Corporation's Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Defendant West Corporation's Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Defendant West Services, Inc.'s Objections and Responses to Plaintiff Timebase's First Set of Requests for Production of Documents (Nos. 1-40) dated Apr. 24, 2008 for *Timebase Pty Ltd.* v. *The Thomson Corp.*, Case No. 07 CV 4551 (D. Minn.).
Timebase's Response to Defendant's First Set of Requests for Production of Documents (Nos. 1-49) dated May 5, 2008 for *Timebase Pty Ltd.* v. *The Thomson Corp.*, Case No. 07 CV 4551 (D. Minn.).
Transcript of Proceedings Re. Defendants' Motion to Consolidate dated Jan. 24, 2008 for *Timebase Pty Ltd.* v. *The Thomson Corp.*, Case No. 07 CV 4551 (D. Minn.).
Transcript of Proceedings Re. Defendants' Motion to Consolidate (filed Feb. 26, 2008) dated Jan. 24, 2008 for *Timebase Pty Ltd.* v. *The Thomson Corp.*, Case No. 07 CV 4551 (D. Minn.).
Transcript of Proceedings Re. Defendants' Motion to Stay (filed Feb. 26, 2008) for *Timebase Pty Ltd.* v. *The Thomson Corp.*, Case No. 07 CV 4551 (D. Minn.).
Timebase's Interrogatories Nos. 1-5 for the Defendant, The Thompson Corporation dated Mar. 24, 2008 for *Timebase Pty Ltd.* v. *The Thomson Corp.*, Case No. 07 CV 4551 (D. Minn.).
Timebase's Interrogatories Nos. 1-5 for the Defendant, West Publishing Corporation dated Mar. 24, 2008 for *Timebase Pty Ltd.* v. *The Thomson Corp.*, Case No. 07 CV 4551 (D. Minn.).
Timebase's Interrogatories Nos. 1-5 for the Defendant, West Services, Inc. dated Mar. 24, 2008 for *Timebase Pty Ltd.* v. *The Thomson Corp.*, Case No. 07 CV 4551 (D. Minn.).
Defendant West Publishing Corporation's Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
Defendant West Services Inc.'s Objections to Plaintiff Timebase's First Set of Requests for Production of Documents (Nos. 1-40) dated Apr. 7, 2008 for *Timebase Pty Ltd.* v. *The Thomson Corp.*, Case No. 07 CV 4551 (D. Minn.).
The Thompson Corporation's Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).
West Publising Corporation's Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).
West Services Inc.'s Objections and Answers to Timebase's First Set of Interrogatories (Nos. 1-5) dated Apr. 28, 2008 for *Timebase Pty Ltd.* v. *The Thomson Corp.*, Case No. 07 CV 4551 (D. Minn.).
Letter from Faegre and Benson enclosing Verification Pages dated May 5, 2008 for *Timebase Pty Ltd.* v. *The Thomson Corp.*, Case No. 07 CV 4551 (D. Minn.).
Letter from David J. F. Gross dated Apr. 1, 2008 for *Timebase Pty Ltd.* v. *The Thomson Corp.*, Case No. 07 CV 4551 (D. Minn.).
Letter from Niro, Scavone, Haller & Niro dated Apr. 17, 2008 for *Timebase Pty Ltd.* v. *The Thomson Corp.*, Case No. 07 CV 4551 (D. Minn.).
Defendants' Memorandum in Support of Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Timebase's Response to Thompson's Motion to Stay and Consolidate dated Jan. 17, 2008 for *Timebase Pty Ltd.* v. *The Thomson Corp.*, Case No. 07 CV 4551 (D. Minn.).
Order (filed Feb. 12, 2008) dated Feb. 7, 2008 for *Timebase Pty Ltd.* v. *The Thomson Corp.*, Case No. 07 CV 4551 (D. Minn.).
Defendant's Appeal of and Objections to Orders Denying a Stay of the '228 Case (No. 07-4551) and Lifting the Stay of the '592 Case (No. 07-1687) dated Feb. 26, 2008 for *Timebase Pty Ltd.* v. *The Thomson Corp.*, Case No. 07 CV 4551 (D. Minn.).
Defendant's Memorandum in Support of Appeal of and Objections to Orders Denying a Stay of the '228 Case (No. 07-4551) and Lifting the Stay of the '592 Case (No. 07-1687) dated Feb. 26, 2008 for *Timebase Pty Ltd.* v. *The Thomson Corp.*, Case No. 07 CV 4551 (D. Minn.).
Order (Exhibit 1) dated Feb. 7, 2008 for *Timebase Pty Ltd.* v. *The Thomson Corp.*, Case No. 07 CV 4551 (D. Minn.).
Order (Exhibit 2) dated Feb. 7, 2008 for *Timebase Pty Ltd.* v. *The Thomson Corp.*, Case No. 07 CV 4551 (D. Minn.).
Timebase's Response to Defendant's Memorandum in Support of Appeal of and Objections to Orders Denying a Stay of the '228 Case (No. 07-4551) and Lifting the Stay of the '592 Case (No. 07-1687) dated Mar. 11, 2008 for *Timebase Pty Ltd.* v. *The Thomson Corp.*, Case No. 07 CV 4551 (D. Minn.).
Order dated Apr. 18, 2008 for *Timebase Pty Ltd.* v. *The Thomson Corp.*, Case No. 07 CV 4551 (D. Minn.).
Defendant's Memorandum Addressing Issues Related to the Reconsideration of the Orders Denying a Stay of the '228 Case (No. 07-4551) and Lifting the Stay of the '592 Case (No. 07-1687) dated Apr. 25, 2008 for *Timebase Pty Ltd.* v. *The Thomson Corp.*, Case No. 07 CV 4551 (D. Minn.).

(56) References Cited

OTHER PUBLICATIONS

Order dated May 6, 2008 for *Timebase Pty Ltd.* v. *The Thomson Corp.*, Case No. 07 CV 4551 (D. Minn.).
Complaint dated Nov. 7, 2007 for *Timebase Pty Ltd.* v. *The Thomson Corp.*, Case No. 07 CV 4551 (D. Minn.).
Defendant's Answer to Plaintiff's Complaint dated Nov. 29, 2007 for *Timebase Pty Ltd.* v. *The Thomson Corp.*, Case No. 07 CV 4551 (D. Minn.).
Order of Direction to the Clerk of the Court for Reassignment of Related Case dated Nov. 28, 2007 for *Timebase Pty Ltd.* v. *The Thomson Corp.*, Case No. 07 CV 4551 (D. Minn.).
Defendant's Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Defendant's Memorandum in Support of Motion to Consolidate with Case No. 07-CV-1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).
Defendant's Prior Art Statement for *Timebase Pty Ltd.* v. *The Thomson Corp.*, Case No. 07 CV 1687 (D. Minn.) Oct. 23, 2009.
Appendix A to Defendant's Prior Art Statement for *Timebase Pty Ltd.* v. *The Thomson Corp.*, Case No. 07 CV 1687 (D. Minn.) Oct. 23, 2009.
Appendix B to Defendant's Prior Art Statement for *Timebase Pty Ltd.* v. *The Thomson Corp.*, Case No. 07 CV 1687 (D. Minn.) Oct. 23, 2009.
Appendix C to Defendant's Prior Art Statement for *Timebase Pty Ltd.* v. *The Thomson Corp.*, Case No. 07 CV 1687 (D. Minn.) Oct. 23, 2009.
Appendix D to Defendant's Prior Art Statement for *Timebase Pty Ltd.* v. *The Thomson Corp.*, Case No. 07 CV 1687 (D. Minn.) Oct. 23, 2009.
Appendix E to Defendant's Prior Art Statement for *Timebase Pty Ltd.* v. *The Thomson Corp.*, Case No. 07 CV 1687 (D. Minn.) Oct. 23, 2009.
Appendix F to Defendant's Prior Art Statement for *Timebase Pty Ltd.* v. *The Thomson Corp.*, Case No. 07 CV 1687 (D. Minn.) Oct. 23, 2009.
Appendix G to Defendant's Prior Art Statement for *Timebase Pty Ltd.* v. *The Thomson Corp.*, Case No. 07 CV 1687 (D. Minn.) Oct. 23, 2009.
Thompson's First Supplemental Objections and Answers to Timebase's First Set of Interrogatories (Nos. 1-5) (Redacted) for *Timebase Pty Ltd.* v. *The Thomson Corp.*, Case No. 07 CV 1687 (D. Minn.) Sep. 3, 2009.
Defendant's Supplemental Prior Art Statement for *Timebase Pty Ltd.* v. *The Thomson Corp.*, Case No. 07 CV 1687 (D. Minn.) Apr. 2, 2010.
Appendix A to Defendant's Supplemental Prior Art Statement for *Timebase Pty Ltd.* v. *The Thomson Corp.*, Case No. 07 CV 1687 (D. Minn.) Apr. 2, 2010.
Appendix B to Defendant's Supplemental Prior Art Statement for *Timebase Pty Ltd.* v. *The Thomson Corp.*, Case No. 07 CV 1687 (D. Minn.) Apr. 2, 2010.
Appendix C to Defendant's Supplemental Prior Art Statement for *Timebase Pty Ltd.* v. *The Thomson Corp.*, Case No. 07 CV 1687 (D. Minn.) Apr. 2, 2010.
Appendix D to Defendant's Supplemental Prior Art Statement for *Timebase Pty Ltd.* v. *The Thomson Corp.*, Case No. 07 CV 1687 (D. Minn.) Apr. 2, 2010.
Appendix E to Defendant's Supplemental Prior Art Statement for *Timebase Pty Ltd.* v. *The Thomson Corp.*, Case No. 07 CV 1687 (D. Minn.) Apr. 2, 2010.
Appendix F to Defendant's Supplemental Prior Art Statement for *Timebase Pty Ltd.* v. *The Thomson Corp.*, Case No. 07 CV 1687 (D. Minn.) Apr. 2, 2010.
Appendix G to Defendant's Supplemental Prior Art Statement for *Timebase Pty Ltd.* v. *The Thomson Corp.*, Case No. 07 CV 1687 (D. Minn.) Apr. 2, 2010.

Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Agosti for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Anwar for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Arnold Moore 1997-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Arnold-Moore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Arnold-Moore 1994-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Arnold-Moore 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Arnold-Moore 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Astoria for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Azaria for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Bachman for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Bentley for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Campbell for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Documentation for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Dolan for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Elmasri 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Fay 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Haake for Timebase's Response to Defendant's Prior Art Statement for *Timebase Pty Ltd.* v. *The Thomson Corp.*, Case No. 07 CV 1687 (D. Minn.) Feb. 1, 2010.

(56) References Cited

OTHER PUBLICATIONS

Claim Chart comparing claims of US Patent No. 6,233,592 to Hansen for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Hirohama 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Horne 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Kim 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Kimball for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Liddy for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Lo 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Lo 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Osterbye 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Povilus 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Promenschenkel 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sacks-Davis 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sacks-Davis 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to SCALEplus for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sciore 1991 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Sciore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Stonebraker 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Taylor for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Travis Waldt for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilkinson for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1988 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 6,233,592 to Wilson 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Agosti for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Anwar for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold Moore 1997-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1994-2 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Arnold-Moore 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Astoria for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Azaria for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Bachman 1973 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Bentley for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Campbell for Timebase's Response to Defendant's Prior Art Statement for *Timebase Pty Ltd.* v. *The Thomson Corp.*, Case No. 07 CV 1687 (D. Minn.) Feb. 1, 2010.

(56) References Cited

OTHER PUBLICATIONS

Claim Chart comparing claims of US Patent No. 7,293,228 to Caplinger for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Documentum for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Elmasri 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Fay 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Haake for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Hansen for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Hirohama 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Horne 1997 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Kim 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Kimball for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Liddy for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Lo 1996 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Noik for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Osterbye 1992 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Povilus 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Promenschenkel 1995 for Timebase's Response to Defendant's Prior Art Statement for *Timebase Pty Ltd.* v. *The Thomson Corp.*, Case No. 07 CV 1687 (D. Minn.) Feb. 1, 2010.

Claim Chart comparing claims of US Patent No. 7,293,228 to Sacks-Davis 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sacks-Davis 1995 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to SCALEplus for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1991 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Sciore 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Stonebraker 1994 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Taylor for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Travis Waldt for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Weinberg for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilkinson for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1988 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1990 for Timebase's Response to Defendant's Prior Art Statement for *Timebase Pty Ltd.* v. *The Thomson Corp.*, Case No. 07 CV 1687 (D. Minn.) Feb. 1, 2010.
Claim Chart comparing claims of US Patent No. 7,293,228 to Wilson 1992 for Timebase's Response to Defendant's Prior Art Statement for *Timebase Pty Ltd.* v. *The Thomson Corp.*, Case No. 07 CV 1687 (D. Minn.) Feb. 1, 2010.
Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to Peltonen for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 7,293,228 to SCALEPlus for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Larson for Timebase's Supplemental Response to Defendant's Prior Art Statement for *Timebase Pty Ltd.* v. *The Thomson Corp.*, Case No. 07 CV 1687 (D. Minn.) May 28, 2010.
Claim Chart comparing claims of US Patent No. 6,233,592 to Peltonen for Timebase's Supplemental Response to Defendant's

(56) References Cited

OTHER PUBLICATIONS

Prior Art Statement for *Timebase Pty Ltd. v. The Thomson Corp.*, Case No. 07 CV 1687 (D. Minn.) May 28, 2010.
Claim Chart comparing claims of US Patent No. 6,233,592 SCALEPlus System for Timebase's Supplemental Response to Defendant's Prior Art Statement for *Timebase Pty Ltd. v. The Thomson Corp.*, Case No. 07 CV 1687 (D. Minn.) May 28, 2010.
Agosti, M., Colotti, R., Gradenigo, G., "A Two-Level Hypertext Retrieval Model for Legal Data," (1991) ("Agosti 1991").
Arnold-Moore, T. & Sacks-Davis, R., "Databases of Legislation: The Problems of Consolidation," Collaborative Information Technology Research Institute, TR-94-9, Jul. 4, 1994 ("Arnold-Moore 1994").
Arnold-Moore, T., "Automatically Processing Amendments to Legislation," 1995 ACM 0-89791-758-8/95/0005/0297 ("Arnold-Moore 1995").
Arnold-Moore, T., "Automatic Generation of Amendment Legislation," 1997 ACM 0-89791-924-6/97/96 ("Arnold-Moore 1997").
Arnold-Moore, T., Anderson, P., Sacks-Davis R., "Managing a Digital Library of Legislation," (1997) ("Arnold-Moore 1997-2").
Azaria, A., Network World, "SGML: a Lifesaver in a Sea of Electronic Documents," (Dec. 12, 1994) ("Azaria 1994").
Bachman, C., "The Programmer as Navigator," (1973) ("Bachman 1973").
Bentley, J., Friedman, J., "Data Structures for Range Searching," (1979) ("Bentley 1979").
Campbell, B., Goodman, J., "HAM: A General Purpose Hypertext Abstract Machine," (1988) ("Campbell 1988").
Caplinger, M., "Graphical Database Browsing," (1986) ("Caplinger 1986").
Haake, A., "CoVer: A Contextual Version Server for Hypertext Applications," Proceedings of the ACM ECHT Conference, Nov. 30-Dec. 4, 1992 ("Haake 1992").
Horne, Roger, "The Statute Law Database," (1997) ("Horne 1997").
Kim, H., Shin, H., Chang, J., "OOHS: An Object-Oriented Hypermedia System," Proceedings of the COMPSAC '96, 0730-3157/96 ("Kim 1996").
Kimball, R., "The Data Warehouse Toolkit: Practical Techniques for Building Dimensional Data Warehouses," (1996) ("Kimball 1996").
Lo, C., "Integrating Links and Versioning in Document Management," (1995) ("Lo 1995").
Lo, C., "Link and Versioning Management in an SGML Based Document Management System," (1996) ("Lo 1996").
Noik, E., "Exploring Large Hyperdocuments: Fisheye Views of Nested Networks," (1993) ("Noik 1993").
Osterbye, K., "Structural and Cognitive Problems in Providing Version Control for Hypertext," (1992) ("Osterbye 1992").
Promenschenkel, G., "STEPS toward a new era in electronic publishing," OCLC Newsletter No. 216, published by OCLC, Jul./Aug. 1995 ("Promenschenkel 1995").
Sacks-Davis, R., Kent, A., Ramamohanarao, K., Thom, J., Zobel, J., "Atlas: A Nested Relational Database System for Text Applications," (1995) ("Sacks-Davis 1995").
Sciore, E., "Multidimensional Versioning for Object-Oriented Databases," Lecture Notes in Computer Science, Deductive and Object-Oriented Databases, Munich Germany (1991) ("Sciore 1991").
Sciore, E., "Versioning and Configuration Management in an Object-Oriented Data Model," VLDB Journal 3, 77-106 (1994) ("Sciore 1994").
Stonebraker, M., Rowe, L., Hirohama, M., "The Implementation of Postgres," (1990) ("Hirohama 1990").
Stonebraker, M., Chen, J., Nathan, N., Paxson, C., Wu, J., "Tioga: Providing Data Management Support for Scientific Visualization Applications," 1994 IEEE Symposium on Visual Languages (1994) ("Stonebraker 1994").
Taylor, C., Tudhope, D., Beynon-Davies, P., "Technical Briefing Representation and Manipulation of Conceptual Temporal and Geographical Knowledge in a Museum Hypermedia System," (1994) ("Taylor 1994").
Travis, B., Waldt, D., "The SGML Implementation Guide: A Blueprint for SGML Migration," (1995) ("Travis & Waldt").
Wilkinson, R., Arnold-Moore, T., Fuller, M., Sacks-David, R., Thom, J., Zobel, J., "Document Computing: Technologies for Managing Electronic Document Collections," (1998) ("Wilkinson 1998").
Wilson, E., "Reference and Reference Inversion in Statutes and Cases: a Hypertext Solution," (1988) ("Wilson 1988").
Wilson, E., "Cases for Justus: Preparing a Case Database for a Hypertext Information Retrieval System," (1990) ("Wilson 1990").
Wilson, E., "Guiding Lawyers: Mapping Law into Hypertext," Artificial Intelligence Review 6, 161-89 (1992) ("Wilson 1992").
Larson R., "Hypertext and Information Retrival: Towards the Next Generation of Information Systems," (1988) (Larson 1988).
Peltonen, H, Mannisto, T., Alho, K., Sulonen, R., "An Engineering Document Management System" (1993) ("Peltonen 1993").
The Premise software ("Premise Software") on CD Labeled THOM00194621.
A sample Premise dataset: Annotated California Codes from 199X ("Premise Statutes") on CD Labeled THOM00194622-23.
Premise Publisher for Windows, User Manual ("Premise Publisher").
Premise Research Software for Windows, User's Guide ("Premise Research").
Westlaw DataBasics(1993) ("DataBasics 1993").
Teply, L., "Legal Research and Citation," (1992) ("Teply 1992").
Johnson, N., Berring, R., Woxland, T., "Winning Research Skills," (1991) ("Johnson 1991").
Password: Power Research,(May 1991) ("Password 1991").
Westlaw Reference Manual(1993) ("Westlaw Ref 1993").
Wren, C., Wren, J., "Using Computers in Legal Research: A Guide to Lexis and Westlaw," (1994) ("Wren 1994").
Discovering Westlaw: The Essential Guide (1992) (DOCNO 00078880) ("Essential Guide").
Westmate 5.1 for Windows, User Manual, (1993) ("Westmate User Guide 1993").
Discovering Westlaw: The Essential Guide (1996) ("Essential Guide").
Arnold-Moore, T., "Information Systems for Legislation," (thesis) (1998?) ("Arnold-Moore Thesis").
Arnold-Moore, T., Clemes, J., Tadd, M. "Connected to the Law: Tasmanian Legislation Using EnAct," 1999. ("Arnold-Moore 1999").
Arnold-Moore, T., "System Architecture: A Developer's View," ("Arnold-Moore A").
Cook, J., Arnold-Moore, T., Paice, S., "Legislation in Its Natural State," SGML Asia-Pacific Conference (Sep. 25, 1996).
CITRI Information (R&D Information) [SAIC001979-SAIC001995].
McGhie, L., O'Sullivan, C., Australian Law Librarian, "Tasmanian, Western Australian and Queensland Legislation on the Internet," (Jun. 1998) ("McGhie 1998").
RMIT, "Connected to the Law: Tasmanian Legislation Using EnAct," ("RMIT 1").
Tadd, M., "A New Way of Looking at the Law: The EnAct Legislation System," ("Tadd").
Tasmanian State Service, "Legislative System Project Newsletter," (Jun. 1997) ("LSP Newsletter 1997") ("TSS 1997").
Tasmanian State Service, "Legislative System Project Newsletter," (Feb. 1998) ("LSP Newsletter 1998") ("TSS 1998").
Screen Shots of EnAct.
http://www.thelaw.tas.gov.au (and subpages, including help screens) (also including prior versions found on www.archive.org).
http://web.archive.org/web/19981205075517/www.thelaw.tas.gov.au/start.html.
http://web.archive.org/web/19990430002036/www.thelaw.tas.gov.au/background.html.
ELI 1997 Conference Program ("ELI Program").
Kerr, P., Hoyle, A., Gilchrist, J., A n Introduction to Legal Resources on the Internet (2000) ("Kerr 2000").
SCALEplus User Manual (Version 3.0, Jan. 20, 1998) ("SCALEplus UM").
http://www.austlii.edu.au/austlii/guide/current/20030315--6.html#Heading1298.
SCALEplus User Manual (Version 3.0, Jan. 20, 1998) ("SCALplus UM 2").
SCALEplus Secrets.

(56) References Cited

OTHER PUBLICATIONS

Documentum LeafConnect for Interleaf (1996) ("Leafconnect 1996").
Interleaf 6 SGML (1995) ("Interleaf 6 1995").
Interleaf 6 Workgroup Tools (1995) ("Interleaf Workgroup 1995").
Interleaf 5 <SGML> User's Guide (1994) ("Interleaf UG 1994").
Interleaf Publisher ("Interleaf Publisher").
Documentum Workspace(Oct. 14, 1996) ("Documentum Workspace 1996").
Documentum Announces First Industrial-Strength Product for Web Content Management: Documentum RightSiteTM assembles current and individualized information for diverse user needs,(Oct. 14, 1996) ("RightSite 1996").
Ovum Evaluation of Documentum (1996) ("Ovum Documentum 1996").
Ovum Evaluation of Interleaf (1996) ("Ovum Interleaf 1996").
De Mets, G., "Consleg Interleaf: SGML Applied in Legislation," (1996) ("Consleg 1996").
Astoria: Information Repository & Management Infrastructure,(Apr. 1997) ("Astoria 1997-1").
XSoft Premieres Document Component Management System,(Mar. 1996) ("Astoria 1996").
Chrystal Software Recognizes that Organizations Want to Reach Out to the Consumers of Their Document Information,(1997) ("Astoria 1997-2").
Astoria Delivers a Complete Document Management System that Offers Powerful Tools to Search, Edit, Share, and Track Documents and Their Components,(1997) ("Astoria 1997-3").
XSoft, A Division of Xerox, Astoria (Jul. 12, 1996), found at http://xml.coverpages.org/duCharme-sgmldbms.html.
XSoft Premieres Astoria; A Simpler Way to Manage 'Mega-Documents', from PR Newswire (Mar. 12, 1996), found at http://www.highbeam.com/doc/1G1 -18079234.html.
XSoft Astoria, found at http://www.architag.com/tag/Article.asp?v=10&i=4&p=8&s=1.
Law Desk NY Official Reports, 2nd Series, Lawyers Cooperative Publishing (1995) ("NY Official Reports") on CD Labeled THOM00213522-24.
New York Consolidated Laws Service, Lawyers Cooperative Pub. Co. (1992) ("NY CLS Beta") on CD Labeled THOM00213530.
Social Security Plus, Version 1.1, Clark Broadman Callaghan (Nov. 1994) ("Social Security Plus") on CD Labeled THOM00213521.
RIA OnPoint CD-ROM Tax Library, Research Institute of America (1992) ("OnPoint") on CD Labeled THOM00213529.
Core Materials on Legal Ethics: An Electronic Publication of the Legal Information Institute Cornell Law School, Cornell University (1995) ("Core Materials on Legal Ethics") on CD Labeled THOM00213536.
New Mexico Law on Disk, The Michie Company (1991) ("New Mexico Law") on CD Labeled THOM00213527.
Federal Rules of Civil Procedure, Cornell University (1995) ("Federal Rules of Civil Procedure") on CD Labeled THOM00213532-333.
Uniform Commercial Code, Disk #1, Articles 1,2,3: An Electronic Publication of the Legal Information Institute of Cornell Law School (1995) ("UCC") on CD Labeled THOM00213531.
Law Desk NY Official Reports, 2d Series, Lawyers Cooperative Publishing (1995) ("Law Desk NY") on CD Labeled THOM00213528.
Law Desk United States Code Service Titles 1-50, US Constitution, Court Rules, Tables, 4th Quarter 1995, Lawyers Cooperative Publishing (1995) ("Law Desk USCS") on CD Labeled THOM00213525.
"Celebrating a Decade of SGML," SGML'96 Conference Proceedings, (Nov. 18-21, 1996).
Campbell, C. and McGurk, J., "Revising Statutes with Computer Support," 8 Statute Law Review 104 (1987).
Chang, E.E., et al., "The Design and Implementation of a Version Server for ComputerAided Design Data," 19 Software-Practice and Experience 199 (1989).

Corbett, M., "Indexing and Searching Statutory Text," 84 Law Library Journal 759-67 (1992).
Cunliffe, D., Taylor, C., Tudhope, D., Query-Based Navigation in Semantically Indexed Hypermedia, Proceedings of the Eighth ACM Conference on Hypertext Hypertext '97 Publisher: ACM Press (Apr. 1997).
DeRose, S., Maler, E., Orchard, D., XML Linking Language (XLink) Version 1.0, W3C Proposed Recommendation (Dec. 20, 2000). [THOMOO198594 THOMOOOO198627].
Dymalski, S., "InterleafTips and Tricks," (1994).
Dynatext Software.
Edelweiss, N., de Oliveira, J.P., Pernici, B., "An Object-Oriented Approach to a Temporal Query Language," 5th International Conference, DEXA 225 (1994).
Elmasri, R. and Wuu, G., "A Temporal Model and Query Language for ERDatabases," Proceedings of the Sixth International Conference on Data Engineering 76 (1990).
Elmasri, R, et al., "The Time Index: An Access Structure for Temporal Data," Proceedings of the Very Large Data Bases Conference (VLDC) (1990).
Folio Views Software (See, e.g., Folio Views Infobase Production Kit Utilities Manual, Version 3.1, Provo, Utah: Folio Corporation (Jun. 1, 1994)).
Francois, P., "Generalized SGML Repositories: Requirements and Modeling," (1996). [THOMOOI98989-THOMOOI99002].
Fuller, M., Sacks-Davis, R., Wilkinson, R., "Presenting Query Results in a Hyperbase," (May 21, 1996) [SAIC000568-SAIC000577].
Goldfarb, C.F., "The SGML Handbook," (Feb. 28, 1991).
Greenleaf, G.et at, "Public Access to Law via Internet: the Australian Legal Information Institute," 6 Journal ofLaw (1995).
Guttman, A, "R-Trees: A Dynamic Index Structure for Spatial Searching," Proceedings of the ACM International Conference on the Management of Data (SIGMOD) (1984).
Haake, A, "Under CoVer: The Implementation of a Context Virtual Server for Hypertext Applications," ACM ECHT '94 Proceedings (1994).
Harold, E., "XML: Extensible Markup Language," (1990). [THOMOOI98945-THOMI98967].
Hoey, M., "The Discourse Properties of the Criminal Statue," in Computer Power and Legal, Walter (ed.) (1988).
HyTime Standard.
Kimball, R. and Strehlo, K., "Why Decision Support Fails and How to Fix It," ACM SIGMOD Record, vol. 24, No. 3, (Sep. 1995).
Kimball, R, "Is ER Modeling Hazardous to DSS?", DBMS, (Oct. 1995).
Kolovson, C.P. and Stonebreaker, M., "Indexing Techniques for Historical Databases," Proceedings ofthe IEEE Data Engineering Conference 127 (1989).
Kolovson, C.P. et al., S-Trees: Database Indexing Techniques for Multi-Dimensional Interval Data, Technical Report UCB/ERL M90/35, Electronics Research Laboratory, College ofEngineering, University ofCalifornia, Berkeley (1990).
Leung, R., "Versioning on Legal Applications Using Hypertext," City Polytechnic of Hong Kong.
Li, C. and Wang, S., "Efficient Storage Structures for Temporal Object-Oriented Databases," 5th International Conference, DEXA 246 (1994).
Lo, C., "Link and Versioning Management in an SGML Based Document Management System," (1996). [THOM00202985-THOM00203208].
Lum, Y, et al., "Designing DBMS Support for the Temporal Dimension," ACM SIGMOD Record, vol. 14, Issue 2 (Jun. 1984).
Maioli, C., Sola, S., Vitali, F., "Versioning Issues in a Collaborative Distributed Hypertext System," Technical Report UBLCS-93-6 (Apr. 1993).
Merrick, F. (Australian Taxation Office) and Robertson, J. (Univ. of Tech.) "Proposal for Participation in the Workshop on Hypertext Systems and Version Support," Proceedings of the Workshop on Versioning in Hypertext Systems, at ACM European Conference on Hypennedia Technology (ECHT'94). http://web.archive.org/web/19991023013328/cs-pub.bu.edu/students/grads/dgd/workshop/robertson.html.

(56) References Cited

OTHER PUBLICATIONS

Rotem, D. and Segev, A., "Physical Organization of Temporal Data," Proceedings of the Third International Conference on Data Engineering 547 (1987).
Snodgrass, R. and Ilsoo, A, "A Taxonomy of Time in Databases," Proceedings of the ACM SIGMOD International Conference on Management of Data 236 (1985).
Spinellis, D., "The Design and Implementation of a Legal Text Database," 5th International Conference, DEXA 339 (1994).
Stonebraker, M., The Design of the Postgres Storage System (1987).
The ISO 8879 SGML Standard.
Travis, B., Waldt, D., "The SGML Implementation Guide: A Blueprint for SGML Migration," (1995). [THOM00204371-THOM00204649].
Van Herwijnen, E., "Practical SGML, Second Edition," (1994).
Wagner, R. and Mansfield, R., "XML All-In-One Desk Reference for Dummies," (2003).
Whitehead, E. James, "Versioning in Hypertext Systems," (1999).
Wilkinson, R., Arnold-Moore, T., Fuller, M., Sacks-Davis, R., Thom, J., Zobel, J., "Document Computing: Technologies for Managing Electronic Document Collections," (1998).
Zizi, M., Beaudouin-Lafon, M., "Accessing Hyperdocuments Through Interactive Dynamic Maps," (1994). [THOM00I98637-THOM00I98646].
Zobel, J., Wilkinson, R., Thom, J., Sacks-David, R., Macki, E., Kent, A., Fuller, M., "An Architecture for Hyperbase Systems Technical Report 42," (Jun. 1991). [THOM00206364-THOM00206378].
Article entitled "An SGML based hypertext information retrieval system" by Anthony Botham et al. Date is unclear. The latest ref it cites is 1992.
Article entitled "Efficient retrieval of Hierarchical structured data" by Justin Zobel et al.
Article entitled "Efficient retrieval of Structured Documents" by Ross Wilkinson et al.
Article entitled "A Formal Model of Databases of Structured Text" by Brian Lowe et al dated Sep. 1994.
Article entitled "SQL a data model and quey language for structured documents" by Tim Arnold-Moore et al dated May 1, 1994.
Article entitled "Querying a large Hyperbase" by Michael Fuller et al undated. Latest reference cited is 1994.
Article entitled "Document computing technologies for managing electronic data collections" by Tim Arnold Moore et al undated.
Article entitled "Issues in the design and implementation of a hyperbase system" by Anthony Botham et al undated.
Article entitled "Simple Anaphoric Reference Resolution for Document Retrival" by Michael Fuller et al undated. Latest ref cited is 1990.
System Architecture for Structured Document Data by Tim Arnold Moore.
An Architecture for Hyperbase systems by Justin Zobel et al.
Integrated Access to Large Document Collections Michael Fuller thesis for his applied Science Degree.
Approaches for Structured Document Management by Tim Arnold Moore.
Presenting Query Results in a Hyperbase by Michael Fuller.
Structured Answers for a large Structured Document Collections by Michael Fuller et al.
Architecture of a content management server for XML Document Application by Tim Arnold Moore et al.
Asset Management, SGML and Database publishing Recapping Seabold 1997.
What you do or don't need hy-time in your document management system. Article by Angerstein Paula published on www.infoloom.com.
Arbortext to offer breakthrough technology for virtual document creation and delivery on paper CC Rom and web. Published on oasis-open.org.
Slowly changing dimensions(Data warehouses can track historical data)(Data warehouse architect)(Technology tutorial)(column) Kimball Ralph published by the Gale Group.
Indexing temporal data using existing B+-trees by Chen Hian Goh et al.
Status Report on SGML Notes from SGML '93 by Walter Mark (Seabold Report).
Hy-time Hypermedia time based Document Structuring Language Stephen Newcomb et al.
About time Legislation's forgotten dimension by Tim Arnold Moore.
Ashman, Helen, Electronic Document Addressing: Dealing with Change, University of Nottingham, ACM Computing Surveys, vol. 32, No. 3, Sep. 2000, p. 201-212.
Prevelakis, Vassilis, A Framework for the Organization and Dynamic Reconfiguration of the World Wide Web, University of Geneva, Aug. 1996.
Sacks-Davis et al., The Structured Information Manager (SIM), ACM 1998.
Sacks-Davis, The Structured Information Manager: A Database System for SGML Documents, Proceedings of the 22nd VLDB Conference, 1996.
Lee et al., Management of Multi-structured Hypermedia Documents: A Data Model, Query Language, and Indexing Scheme, Kluwer Academic Publishers, May 1, 1991.
Cowan et al., Enhancing Code for Readability and Comprehension Using SGML, IEEE 1994.
Poulin et al., The Other Formalization of Law: SGML Modelling and Tagging, Undated.
Deposition Transcript of Timothy J. Arnold-Moore Ph.D. including Exhibits 1-9, 11, 14-18 for for *Timebase Pty Ltd.* v. *The Thomson Corp.*, Case No. 07 CV 1687 (D. Minn.) Jun. 22, 2010.
Deposition Transcript of Christoph Schnelle including Exhibits A.M. 2, A.M.3, A.M.14, 59-61, 123, 125, and Schnelle 1-5 for *Timebase Pty Ltd.* v. *The Thomson Corp.*, Case No. 07 CV 1687 (D. Minn.) Aug. 11, 2010.
Deposition Transcript of Nicola Jane Lessing including Exhibits 59-61, 95, 113-117, 119, and 120 for *Timebase Pty Ltd.* v. *The Thomson Corp.*, Case No. 07 CV 1687 (D. Minn.) Aug. 10, 2010.
Helen Ashman, Electronic Addressing: Dealing with Change. Sep. 2000, ACM, pp. 201-212.
Lee et al., CPI: Constraints-Preserving lnlining Algorithm for Mapping XML DTD to Relational Schema, Data & Knowledge Engineering 39, 2001, pp. 3-25.
Complaint from sister patent 8,386,484 filed in Northern District of Illinois, Jul. 15, 2013 in civil case 1:13 cv-05044.
Defendant's Answer from sister patent 8,386,484 filed in Northern District of Illinois, Sep. 9, 2013 in civil case: 1:13 cv-05044.
Second Amended Complaint—Civil case 3:13-cv-00422-WHR, US District Court, Southern District of Ohio, Western Div., Apr. 15, 2014.
Exhibit H from Second Amended Complaint of item #1this list, Claim Chart, Apr. 15, 2014.
Communication of the Board of Appeals (EPO)—EP 98901249.7 Appeal No. TO328/09-3.5.07. Nov. 21, 2014.

\* cited by examiner

200

```
16 Oct 1995 to 31 Dec 2001 :   s 59
▶ 01 Jan 1994 to 15 Oct 1995 :   s 59 ◀
```
— 220

—215

◀ ⊘ ▶                                                    Versions of s.59
                                                    (base date 20 Jul 2000)
                        Corporations Act 1989 (Cth) s 59
                            (Scope: until 15 Oct 1995)
— 205

59. Enforcement of judgments etc
*Scope: until 15 Oct 1995*
— 210

Versions   Amendments                                    Shift view

(1) A judgment of the Federal Court, the Family Court or the Supreme Court of the Capital Territory that is given, in whole or in part, in the exercise of jurisdiction conferred by this Division, or by a law of a State that corresponds to this Division, is enforceable in the Capital Territory as if the judgment had been given by that Court entirely in the exercise of the jurisdiction of that Court apart from this Division or any such law.

(2) Where:

(a) a provision of a law of the Commonwealth or of the Capital Territory (not being a law in relation to the enforcement of judgments) refers to a thing done by the Federal Court, the Family Court, the Supreme Court of the Capital Territory or of a State or a State Family Court; and (b) that thing is done by another court in the exercise of jurisdiction conferred by this Division or a law of a State corresponding to this Division;

the reference in that provision to the Federal Court, the Family Court, the Supreme Court of the Capital Territory or of that State, that State Family Court, as the case may be, is taken as a reference to that other court.

Fig. 2

MALTWEB MULTI-AXIS VIEWING INTERFACE AND HIGHER LEVEL SCOPING

CROSS REFERENCE TO RELATED APPLICATIONS

This application is a continuation of U.S. application Ser. No. 09/689,927, filed on Oct. 12, 2000, now allowed, which is a continuation-in-part of U.S. application Ser. No. 09/108,999, filed on Jul. 1, 1998, now U.S. Pat. No. 6,233,592, which is a continuation of International Application No. PCT/AU1998/000050, filed Jan. 30, 1998, which designated the United States and was published in English, and which claimed priority to Australian Application No. PO4892, filed on Jan. 31, 1997. Each of these applications, in their entirety, are incorporated herein by reference.

FIELD OF THE INVENTION

The present invention relates generally to an electronic publishing system and, in particular, to aids for navigating in an electronic publishing system and a method of organising data in an electronic publishing system

BACKGROUND

International Publication No. WO 98/34179 (PCT/AU98/00050), corresponding to U.S. patent application Ser. No. 09/108,999, is incorporated herein by cross reference and discloses an electronic publishing system that provides a sparse multidimensional matrix of data using a set of flat file records. In particular, the computer-implemented system publishes an electronic publication using text-based data. Predefined portions of the text-based data are stored and used for the publication. At least one of the predefined portions is modified, and the modified version is stored as well. The predefined portion is typically a block of text, greater in size than a single word, but less than an entire document. Thus, for example, in the case of legislation, the predefined portion may be a section of the Act. Each predefined portion and the modified portion(s) are marked up with one or more links using a markup language, preferably SGML or XML. The system also has attributes, each being a point on an axis of a multidimensional space for organising the predefined portions and the modified portion(s) of the text-based data. This system is simply referred to as the Multi Access layer Technology or "MALT" system hereinafter.

Existing methods of navigating electronic publications have been derived from traditional methods used to navigate printed publications. Typical of these methods is the use of a bookmark, which is merely an indicator which identifies a page or section of interest. Bookmarks are typically limited in the information provided to users. Bookmarks follow a single axis, perhaps indicating the current page, chapter and title of the publication. However, bookmarks do not necessarily provide the user with adequate context pertaining to how the user arrived at the current page. If a user knows the exact publication desired and then navigates through the same publication, a bookmark is probably adequate for the user's needs. In the event that the user has conducted a number of searches and trawled through various versions of diffract documents to arrive at the current page of a publication, it is impossible for a bookmark to capture all the relevant information and provide the user with an adequate reading context. The book metaphor fails to address the abilities and complexities of electronic publications.

Existing methods of navigating compact disc based publications and Internet sites are typically ill-suited to displaying the complex data provided by MALT. Known web solutions, for example, typically handle two axes, sequential and hierarchical, using either embedded links such as Previous, Next and Contents, or expandable content frames, as provided in Windows Explorer. Further axes may be bandled by incorporating embedded links in the body of the text. Such embedded links a point to point, and provide limited navigational value to the user.

Object databases are capable of providing the required finality, but search queries employed by these databases are too complicated for untrained users, both in terms of the complexity and amount of information required.

Thus, a need clearly exists for a detailed context to be provided to users of electronic publishing, overcoming one or more disadvantages of existing systems.

SUMMARY

According to a first aspect of the invention, there is provided a method of navigating in a multidimensional space containing an electronic publication formed from predefined portions of text-based data encoded using a markup language. The method includes the steps of:

displaying a selected one of the predefined portions in a first display region; and displaying a point on a selected axis of the multidimensional space for the displayed predefined portion.

According to a second aspect of the invention, there is provided a method of navigating in a multidimensional space containing an electronic publication formed from predefined portions of text-based data encoded using a markup language. The method includes the steps of:

providing a view comprising at least two anchor sets;

displaying at least one base point and at east a first axis depending from the base point;

displaying at least one of a further point and an axis derived from the base point;

navigating a multidimensional space formed by the points and axes;

returning to the base point when required; an adjusting the view so a current view point becomes a new base point.

According to a third aspect of the invention, there is provided an apparatus for navigating in a multidimensional space containing an electronic publication formed from predefined portions of text-based data encoded using a markup language. The apparatus includes:

a device for displaying a selected one of the predefined portions in a first display region; and a device for displaying a point on a selected axis of the multidimensional space for the displayed predefined portion.

According to a fourth aspect of the invention, there is provided an apparatus for navigating in a multidimensional space containing an electronic publication formed from predefined portions of text-based data encoded using a markup language. The apparatus includes:

a device for providing a view comprising at least two anchor sets;

a device for displaying at least one base point and at least a first axis depending from said base point;

a device for displaying at least one of a further point and an axis derived from the base point;

a device for navigating a multidimensional space formed by the points and axes;

a device for returning to the base point when required; and a device for adjusting the view so a current view point becomes a new base point.

According to a fifth aspect of the invention, there is provided a computer program product having a computer readable medium having a computer program recorded therein for navigating in a multidimensional space containing an electronic publication formed from predefined portions of text-based data encoded using a markup language. The computer program product includes:

a computer program code module for displaying a selected one of the predefined portions in a first display region; and a computer program code module for displaying a point on a selected axis of the multidimensional space for the displayed predefined portion.

According to a sixth aspect of the invention, there is provided a computer program product having a computer readable medium having a computer program recorded therein for navigating in a multidimensional space containing an electronic publication formed from predefined portions of text-based data encoded using a markup language. The computer program product includes:

a computer program code module for providing a view comprising at least two anchor sets;

a computer program code module for displaying at least one base point and at least a first axis depending from said base point;

a computer program code module for displaying other points, axes or both derived from said base point;

a computer program code module for navigating a multidimensional space formed by said points and axes;

a computer program code module for returning to said base point when required; and a computer program code module for adjusting the view so a current view point becomes a new base point.

According to a seventh aspect of the invention, there is provided a method of publishing an electronic publication formed from predefined portions of text-based data encoded using a markup language. The method includes the steps of:

storing predefined portions in terminal nodes; and providing one or more higher level nodes for organising said terminal nodes to correspond with a hierarchical structure embodied in said electronic publication, wherein each higher level node consists of the identity of a parent node, a position indicator for said higher level node, and an identifier.

According to an eighth aspect of the invention, there is provided an apparatus for publishing an electronic publication formed from predefined portions of text-based data encoded using a mark language. The apparatus includes:

a device for staring predefined portions in terminal nodes; and a device for providing one or more higher level nodes for organising said terminal nodes to correspond with a hierarchic structure embodied in said electronic publication, wherein each higher level node consists of the identity of a parent node, a position indicator for said higher level node, and an identifier.

According to a ninth aspect of the invention, there is provided a computer program product having a computer readable medium having a computer program recorded therein for publishing an electronic publication formed from predefined portions of text-based data encoded using a markup language. The computer program product includes:

a computer program code module for string predefined portions in terminal nodes; and a computer program code module for providing one or more higher level nodes for organising said terminal nodes to correspond with a hierarchical structure embodied in said electronic publication, wherein each higher level node consists of the identity of a parent node, a position indicator for said higher level nods and an identifier.

Other aspects of the invention are also disclosed.

BRIEF DESCRIPTION OF THE DRAWINGS

One or more embodiments of the present invention am described hereinafter with reference to the drawings, in which:

FIG. 2 is a screen shot of a Versions axis view of a MALT publication in accordance with an embodiment of the present invention;

DETAILED DESCRIPTION

Overview

Figure 1:
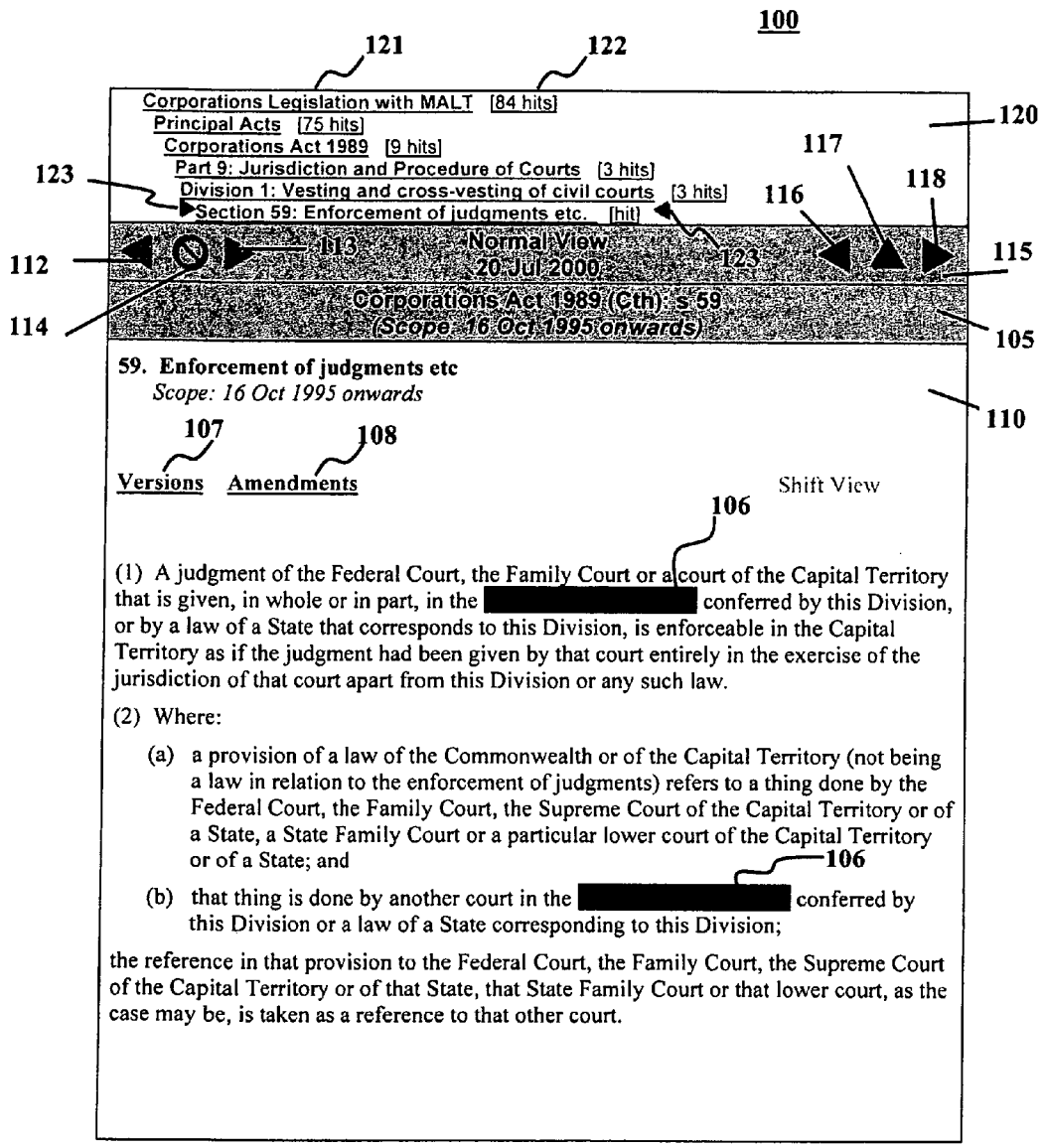
FIG. 1 is a screen shot of a Normal axis view of a MALT publication (with a search mode enabled) in accordance with an embodiment of the present invention.

A method, apparatus and computer program product for navigating in a multidimensional space containing an electronic publication formed from predefined portions of text-based data encoded using a markup language are disclosed. In the following description, numerous specific details are set forth. However, It will be apparent to those skilled in the art in view of this disclosure that changes may be made without departing from the scope and spirit of the invention. In other instances, well known features have not been described in detail so as not to obscure the invention. Whilst the invention may be preferably praised on flat files, it will be apparent to a person skilled in the art that the invention may also be practised on databases. A database may be constructed from sets of flat file records. A relational database is a collection of related tables each table being a set of flat files having the same structure. The method includes the step of: displaying a selected one of the predefined portions in a first display region. The display region preferably takes the form of an area of real estate on a computer screen (henceforth referred to as the "content frame"). The method also includes the step of displaying a view into a primary axis of the multidimensional space in which the displayed preferred portion is clearly marked. This second area of the computer screen shall be refereed to as the "reference frame". Each frame has an associated "anchor", which is a title bar clearly indicating the nature of the view currently displayed in the frame. The reference anchor also contains tools for navigating the displayed axis. The method also includes the step of displaying a point on a primary axis of the multidimensional space for the displayed predefined portion.

The method may be enhanced by displaying a second point on a second axis which relates to the first axis at the first point. The second axis represents time-based versions of the selected one of the predefined portions. Alternatively, the second axis represents amending legislation that was applied to the selected one of the predefined portions. In another example, the second axis represents case law that applied the selected one of the predefined portions. In further example, the second axis represents annotations to the selected one of the predefined portions. In a yet further example, the second axis represents entries of a subject index that are covered in the selected one of the predefined portions.

The embodiment of the present invention allows for a primary axis (the combined hierarchical/sequential or normal axis). A "base node" may be selected by navigating the primary axis. The method then allows for one of a number of potential axes (associated with the base node) to be selected and subsequently navigated. The selection is accomplished by means of activating "links" in the displayed base node. The reference frame is redrawn to give a view of the members of the selected axis and one member of that axis is displayed. At any point it is possible to return to the primary axis and select a new base node. Alternatively, the currently displayed base node may be chosen as a new base node from which subsequent axes are derived. In this manner, any number of axes may be displayed and navigated without increasing the complexity of the screen view (i.e. only two frames are ever required). It is this quality which allows a complex dataset to be navigated by a non-specialist end user.

By way of example, a user may select a first node, corresponding to a provision, in the multidimensional space. The first node's locator is displayed in a first anchor to provide the user with a first point of reference. If the user is interested in different versions of the provision, the user may then move to second node on an orthogonal axis, being the Versions axis. The first anchor is updated and displays the locator of the second node. A second anchor displays the locator of the first node. The second anchor also displays the relationship between the first node and the second node. The user is provided with information which indicates the original provision that was being studied, the provision currently being studied and the current provision's relationship to the original provision. Thus, the first and second anchors and the information provided therein enable the user to navigate the multidimensional space.

Where reference is made in any one or more of the accompanying drawings to steps and/or features, which have the same reference numerals, those steps and/or features have for the purposes of this description the same function(s) or operation(s), unless the contrary intention appears.

The principles of the preferred method described herein have general applicability to electronic publishing. However, for ease of explanation, the steps of the preferred method are described with reference to navigating in a MALT publication. However, it is not intended that the present invention be limited to the described method. It will be appreciated by those skilled in the art that a publication could include a document or a database. The invention may apply to any hierarchical XML data where any of the nodes may change independently of other nodes in the hierarchy. Typical examples might include manuals and newspapers. For example, the invention may have application to the production and display of aircraft manuals. In this case, each node would be a set of maintenance instructions for a part or assembly. The axes might be part number; category (electrical, structural, etc.); location (Boeing 737, wing, wingtip assembly, eddy baffle, securing flange AX-703); airline (United, QANTAS); language (English, French). Since each commercial aircraft is in effect a one-off construct, the basic information needs to be reconfigured for each plane, each airline, etc.

Before proceeding with a description of the embodiments, a brief review of terminology is discussed hereinafter. A dataset refers to the complete set of data that is to be navigated. A dataset has a complete set of discrete objects called nodes. The dataset may be viewed as a sparse multidimensional matrix, as is produced using the MALT publishing method. In the example of this specification, the dataset preferably refers to a body of legislation designed for point in time searching.

A node preferably corresponds to a particular legislative provision at a particular date. A base node is a particular node from which one or more viewing axes may be derived.

A viewing axis is an ordered set of nodes derived from a single base node. The base node itself may or may not constitute part of the axis. For example, given a particular provision in time, three possible viewing axes are: the set of all provisions in force on the same date as the base node; the set of versions of the base provision in time; and the set of amending provisions most recently applied to the base provision. Further viewing axes may be practised, and may include case law that applied the provision, annotations to the provision and entries of a subject index that are covered in the provision.

A provision, for the purposes of this system, is a unit of legislation having a heading and/or content, but not including text belonging to any sub-provision that is a predefined portion of text. A provision may be an Act, a schedule, a chapter, a section or other legislative unit. A provision has a scope in time, such that when a provision is amended, a new provision is created. A provision corresponds to a set of nodes, each node corresponding to a range of dates in the scope of the provision.

Scope refers to a period of time during which a provision is in force. Thus, a given scope is usually expressed as start and end dates. A provision's scope is determined by the dates on which the provision commenced, was amended and/or was repealed.

A locator is an identifier that is used to locate a particular node. For example, a locator may be a date, or a position such as the name of an Act and a section number.

Multi-Axis Viewing Interface

Using the publication of legislation as an example, a provision is defined as being an amendable unit of legislation. At any given moment, the body of active legislation can be divided into provisions. Provisions also have a scope in time, so that when a provision is amended, the current provision goes out of scope and a new provision is created. The node of the dataset in this example are provisions with an associated date. Two locators are required to specify a particular node uniquely; a position (such as act and section number) and a date.

There are a number of viewing axes associated with each node. As indicated in the explanation of terminology above, a viewing axis is defined as an ordered set of nodes that can be derived from the current node. When XML data is converted to a series of flat files, viewing axes are derived from the current node as a result of an intersection between two flat files. Two flat files intersect if common entries are contained in the fields of the respective flat files. For example, a legislation flat file may contain a field "Identifiers of cases that apply this provision". The legislation flat file shares a common entry with a case law flat file. Alternatively, the legislation flat file may contain a field "subjects covered in the provision". In this example, the legislation flat file shares a common entry with a subject index flat file. Alternatively, an amending legislation flat file may have a field "Identifiers of provisions amended by this provision" and share a common entry with the legislation flat file.

In a preferred example, seven such viewing axes are;

Sequential ( . . . ; s 26; s 27; s 27A; . . . ),

Hierarchical ( . . . ; Corporations Act 1989; Part 2; Division 2.1; s 27),

Temporal (the set of versions of the current provision in time),

Source (the set of provisions which amend the current provision),

Case law (cases that apply the current provision),

Annotations (annotations to the current provision), and

Subject (Entries of a subject index that are covered in the current provision).

The above axes are orthogonal in the sense that none can be directly derived from another. Thus, the temporal axis cannot be derived from the sequential axis. Moreover, members of the temporal axis are not simply those provisions sharing the same locator as the current provision. As a result of renumbering, members of the same temporal axis may possibly have widely differing locations. While the example uses two locators and four viewing axes, the MALTweb interface is capable of handling as many locators and axes as required.

Having utilised MALT to construct a set of data encapsulating the above relationships, the problem is how to access this data in a meaningful way. To provide an untrained user with full multi-axis access to MALT type data whilst main in a consistent look and feel throughout, a view consisting of a two frame screen is provided.

FIG. 1 is a screenshot 100 depicting a section of legislation in accordance with an embodiment of the invention. A content frame 110 displays the content of the current node. In essence, this frame 110 constitutes a known portion of display "real estate". In the example of FIG. 1, the node corresponds to Section 59 of the Commonwealth Corporations Act 1989 and the node has a scope of 16 Oct. 1995 onwards. The scope indicates the time during which the provision is in force. The content anchor 105 of the content frame 110 displays the locators for the current content provision in a user friendly form, such as:

Corporations Act 1189 (Cth)

s 59

Scope

16 Oct. 1995 Onwards

Situated above the content anchor 105 is a reference frame 120, which contains a set of links 121 corresponding to the members of a viewing axis associated with the current base node. Reference markers 123 indicate which of the links 121 is currently selected. In the Normal view, the content node shown in the content frame is always the same as the base node for the reference frame. In the Version view, the content node and base node are initially the same, but deviate when a different version is selected. In the Source view, the base node is being amended and the content node is one of the amending provisions.

The reference frame 120 has a corresponding reference anchor 115, which describes the current viewing axis and provides buttons 116, 118 for navigating the sequential axis and button 117 for accessing higher levels of the hierarchy. These levels can also be accessed via the links 121 in the reference frame. In the example, the reference anchor 115 indicates that the user is being shown a normal view of s59, as in force on 20 Jul. 2000. This view also shows the search mode, in which the text "exercise of jurisdiction" has been located. The buttons 112, 113 allow access to the next or previous occurrence of this text, whilst button 114 cancels the search. The "hits" links 122 in the reference frame allow rapid access to occurrences of the search text in other parts of the document. In this respect, the search mode acts very much like a separate viewing axis. The highlighting 106 indicates the selected text. Finally, the link 107, 108 allow access to the other viewing axes (in this case, Versions and Amendments).

Where appropriate, the reference anchor 115 may indicate the base node of the viewing axis. The base node is the node from which the viewing axis is derived. For example, the reference anchor 315 of FIG. 3, which shows a Source axis view of the same provision depicted in FIG. 1, displays the following information:

Provisions Amending

Effective 16 Oct. 1995

Corporations Art 1989 (Cth)

s 59

This indicates that the Source axis being viewed by the user is derived from the base provision: Corporations Act, s59 [16 Oct. 1995 onwards]. The content anchor 305 details the amending provision, which in this example is Corporations Legislation Amdt Act 1994 (Cth):Sch 1.

The relationship of the base node and the content node depends on the view. In the Normal axis view, consisting of the sequential and hierarchical axes, the base node and the content node are always the same. In the Versions axis view, the base node and the content node may or may not be the same. A view is, therefore, defined as the display of a particular content node in relation to a specified axis. Each view may be uniquely identified from the following: the current content node, the curt viewing axis, and the base node of the viewing axis. To further help the user in distinguishing the different viewing axes, the reference frame links may optionally vary in colour, content and indenting style among the views.

FIG. 2 shows a Version axis view 200 of the provision depicted in FIG. 1. The content anchor 205 indicates that the provision being displayed is, in fact, an earlier version of the provision displayed in FIG. 1. Thus, the information shown in the content frame 210 has a different scope from the information shown in content frame 110 of FIG. 1. Closer examination of the information of the content frame 210 and the information of content frame 110 indicates that amendments have in fact been made between the two versions of the provision.

The reference frame 220 of FIG. 2 indicates that there are two versions of the provision, a first version with a scope of 1 Jan. 1994 to 15 Oct. 1995 and a second version with a scope of 16 Oct. 1995 to 31 Dec. 2001. Bach version of the provision is a distinct node on the Version axis. The reference anchor 215 indicates that the user is navigating along the Versions axis view of section 59.

Figure 3:
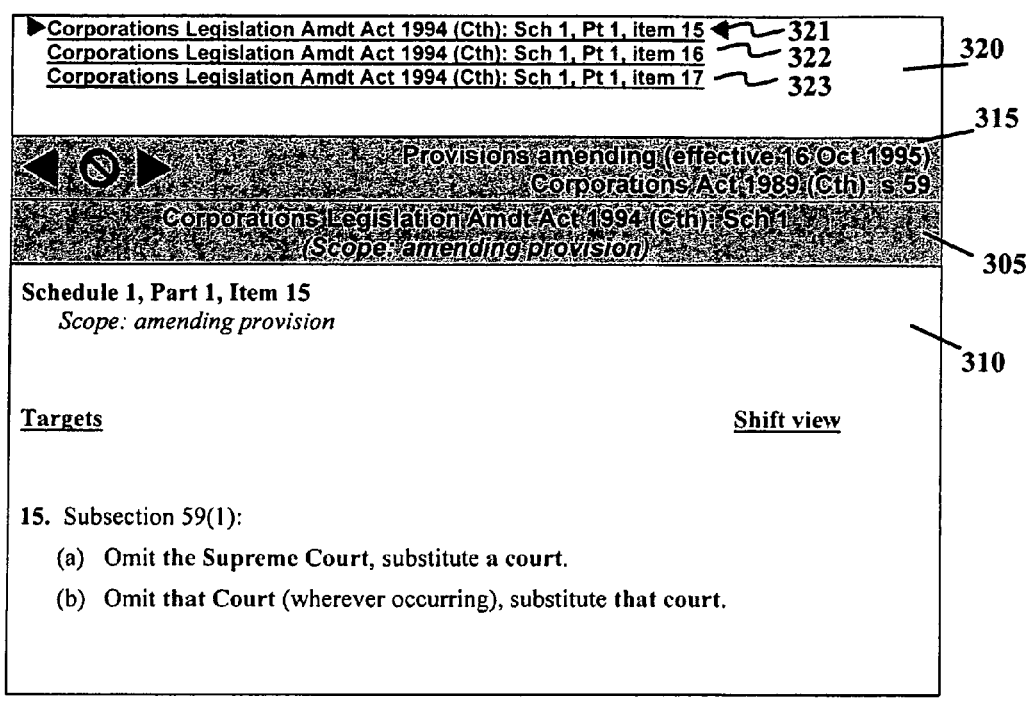
FIG. 3 is a screen shot of a Source axis view of a MALT publication in accordance with an embodiment of the present invention.

FIG. 3 shows a Source axis view 300 of the provision under consideration. The reference anchor 315 of FIG. 3 indicates to the user that the material being displayed relates to provisions amending the Corporations Act 1989 (CTH); s 59. The reference frame 320 indicates that there are three relevant nodes 321, 322, 323 on the source axis. Each node commands to a provision which amends the current provision. The amending provisions are not necessarily sequential and may be non-consecutive and/or in different schedules and/or in different Acts. The content anchor 305 indicates that the current information being shown is Schedule 1, Part 1. Item 15 of the Corporations Legislation Amendment Act 1994, corresponding to the first node 321 shown in the reference fame 320. The content of the amending act is displayed in the content file 310.

Thus, the multi-access viewing interface provides a user with content and reference components. Anchors uniquely identify the content node by position and date, and the viewing axis by base node and axis type. Furthermore, the reference frame is capable of displaying multiple viewing axes for a given base node, as illustrated in FIGS. 1-3.

Higher Level Scoping

The MALT concept encapsulates the ability to store the contents of a sparse multidimensional matrix in a set of flat file records. As previously defined, the scope of a provision is a time period during which the given provision is in force. A problem arises relating to scoping a record which encompasses a number of lower level records.

Consider as an example legislation marked up for point in time searching. The body of the legislation consists of provisions (or nodes), where each provision is an amendable unit of legislation. For the purposes of this example, each provision possesses the following four properties:

A single parent, or container provision in which the current provision resides. [The children of a provision are those provisions which have the current provision as the parent.]

A position within a provision's parent, and (optionally) an associated locator (eg. the fourth child provision of an Act may have the locator "Chapter 2A").

A scope in time (i.e. start and end dates).

The content of the provision.

The provisions are divided into three classes:

A single root node, which has no parent, but from which all other nodes ultimately descend;

A set of terminal nodes, which have no children; and

A set of higher level nodes which are neither the root node nor terminal.

The legislation can then be said to form a tree descending from the root node and containing the terminal nodes at the ends of the root node's branches.

The scope of a terminal node is the period of time between the terminal node's start date and end date, inclusive. The root node is deemed to be always in scope. The scope of a node which is neither a terminal node nor a root node is problematic.

For example, a chapter may encompass many sections, but the chapter's actual content, viewed in isolation as a record, is simply the chapter's title, including locator if present, and any notes or other attachments that apply to the chapter as a whole. All other content is contained indirectly via the chapter's descendant provisions, such as parts, sections and the like.

Difficulty arises in determining the scope of the chapter node. In one sense, the scope of the chapter node is the sum of the scopes of the chapter node's descendants. A question then arises if, for example, the chapter's title is altered. The same applies to the case in which the abovementioned notes or other attachments are altered.

One solution is to create a duplicate chapter with the altered title. While effective, this method has some major drawbacks. Firstly, it involves a great deal of unnecessary duplication of material. Since each child provision can have only one parent; new copies of every sublevel have to be made. The scope of both the original and duplicate sublevels then have to be split at the date of the chapter's title change. This in turn requires each sub-level to behave as though amended, even though the amendment only applies to the title of an ancestor level.

A better solution is to create a new terminal sub-level of the chapter which contains just the title and associated text. This sub-level can then be scoped independently of the main level, and other sub-levels are unaffected. The sub-levels retain the same parent as the chapter level itself was not affected by the amendment.

However, this still leaves open the question of what to do with the scope of the chapter level. Clearly a chapter, like any other provision, can be created or red. Thus, an amendment such as "repeal Chapter 2A" should end the scope of the chapter level as well as all of the chapter's descendants.

The editors, however, may wish to leave a stub entry to mark the place of the former chapter thus:

Chapter 2A

Repealed

The scope of the stub clearly lies outside the scope of the chapter. There are three possible solutions:

allow the [repealed] entry (which stands in place of a normal title) to live inside the chapter, even though the entry is out of the chapter's scope;

a extend the scope of the chapter to encompass the scope of the stub; or create a new chapter level containing just the stub.

The first option creates significant inefficiencies in the design, since the scope of a sub-level cannot be assumed to lie within the scope of the sub-level's parent. The other two options give rise to potential conflicts between the stub and possible replacement chapters.

Having delegated the title and other general notes to their own sublevels, all content has effectively been removed from the chapter. However, a chapter level is still required, as removing higher levels makes all terminal nodes direct children of the root. This in turn severely impacts on the usefulness of the data when mapped to a hierarchical form, such as XML.

In addition, a higher level does contain one property, namely one or more locators ("Chapter 2A" in the example). While this property can theoretically be delegated to yet another sub-level, the practical implications are significant. In particular, the locator reflects the ordering of the chapter amongst its siblings. If, for example, an amendment renumbers chapter 2A to chapter 4, this gives rise to the issue of whether the chapter comes before or after chapter 3 in either a flat file or in XML. For this reason, the locator is the sole property preserved by a higher level node throughout the higher level node's scope. If the position is changed, then a new level (and sub-levels) is created.

This still leaves the problem of the scope of a higher level. For example, if Chapter 2A is repealed and a new, unrelated chapter 2A immediately takes the place of the repealed Chapter 2A, a problem is potentially presented as to two overlapping scopes for the same provision. The scope of the original node has to be terminated, otherwise there are two Chapter 2As in scope contemporaneously. The co-existence of two Chapter 2As poses a detrimental impact on the ability to navigate and search the legislation under consideration. In the situation in which the original Chapter 2A has a repeal stub, the original Chapter 2A's scope may overlap the new Chapter 2A, since the stub may continue indefinitely in time. Among many possibilities, a repeal stub may be provided while Chapter 2A does not exist.

Other problems include: repeal or substitution of a higher level node; renumber/relocation of a higher level node;

renaming (without renumbering/relocation) of a higher level node; elevation or demotion of a higher level node within the hierarchy, e.g. changing a part to a chapter or a division to a subdivision; and insertion/removal of an intermediate level heading node, requiring that nodes which follow and are/ were, according to their type, inferior to that heading node become/cease to be children of that node.

In order to resolve these problems, the following design rule is applied:

Higher level nodes may have neither scope nor content. In other words, a non-terminal node must be a container only. A non-terminal node's only properties are a parent indicator, a position within the parent, and (optionally) a locator. Any content notionally belonging to such a node, such as a chapter title, is assigned to a new (terminal) child node. A (terminal) child node may contain a label, which is preferably a title, but can be or include other data related to the parent node. The new child node preserves the scope of the title, so (for example) a single chapter may possess a number of (temporally disjoint) title nodes.

Higher level scoping has a number of surprising but useful consequences. In particular, a higher level provision is, in itself, not subject to amendment. Thus, an instruction such as "Repeal Chapter 2A" actually terminates the scope of all of Chapter 2A's constituent terminal nodes. The chapter node, having no scope of its own, is unaffected.

Additionally, the previously described problem pertaining to the overlapping scope of the 2A repeal stub disappears. Embodiments of the invention utilise the following approaches. When Chapter 2A is repealed, the associated scope of all terminal nodes within Chapter 7A is terminated. In a first embodiment, a new Chapter 2A is enacted immediately after the original chapter is terminated. The new Chapter 2A has an associated scope commencing on the day after which the original Chapter 2A was repealed. In a second embodiment, a repeal stub is introduced. A repeal stub in the preferred embodiment is a title with an attribute marking this title as being of the type "repeal stub". The repeal stub has an associated scope with a start date corresponding to the date after which Chapter 2A was repealed. The repeal stub has the Chapter 2A node as a parent. If a new Chapter 2A is later enacted, the scope of the repeal stub is terminated and the scope of the terminal nodes of the now Chapter 2A will begin on the day after the end date of the repeal stub's scope.

Thus, a request "for Chapter 2A on date X" returns a description of Chapter 2A that was valid an that date. In the event that the request is for a date on which the chapter is repealed, the fact that the chapter is not in force, having been paled on or before that date, will be returned.

A portion of Document Type Definition (DTD) code which is used to enable higher level scoping appears in Tables 1 to 7 below:

TABLE 1

```
<!--
###########################################################
    ENTITY:    hlev-id
    PURPOSE:   Concatenation of the elements that make the
Identification of a higher level element. Only to be used for levels in
which the <desc> can be MALTed - for levels in which the whole level
should be MALTed (ie, section, reg, schedule) and for their sub-levels,
use %lev-id;.
###########################################################
-->
<!ENTITY % hlev-id
    "(target*, label?, (desc, %amendments;)*)"
>
```

TABLE 2

```
<!ELEMENT act
    (%hlev-id;,
    (%hnote; | %raw;)*,
    (longtitle, %amendments;)+,
    preamble*,
    (chapter* | part* | section*),
    (schedule* | include+)*,
    hist* )
>
<!ATTLIST act
    juris
        (cth|nsw|vic|qld|sa|wa|tas|act|nt|imp)
        #REQUIRED
    year
        CDATA
        #REQUIRED
    number
        CDATA
        #REQUIRED
>
```

TABLE 3

```
<!ELEMENT regulations
    (%hlev-id;,
    (%hnote; | %raw;)*,
        (chapter* | part* | reg*),
        (schedule* | include+)*
    )
>
<!ATTLIST regulations
    juris
        (cth|nsw|vic|qld|sa|wa|tas|act|nt|imp)
        #REQUIRED
    year
        CDATA
        #REQUIRED
    number
        CDATA
        #REQUIRED
>
<!ELEMENT chapter
    (%hlev-id;,
    (%hnote,)*,
    (((%secreg;)*, part*) | article+))
>
<!ATTLIST chapter
    id
        CDATA
        #IMPLIED
    next-id
        CDATA
        #IMPLIED
>
```

TABLE 4

```
<!ELEMENT part
    (%hlev-id;,
    hist*,
    (((%secreg;)*, division*) |
        (article+ | item+ | clause+) |
        (guide+) |
        (unconverted+)))
>
<!ATTLIST part
    id
        CDATA
        #IMPLIED
    next-id
        CDATA
        #IMPLIED
>
```

TABLE 5

```
<!ELEMENT division
    (%hlev-id;,
    (p | %hnote;)*,
        (((%secreg;)*, subdivn*) |
        (clause*, item*)))
>
<!ATTLIST division
    id
        CDATA
        #IMPLIED
    next-id
        CDATA
        #IMPLIED
>
```

TABLE 6

```
<!ELEMENT subdivn
    (%hlev-id;,
    (%hnote;)*,
        ((%secreg;)+ | clause+))
>
<!ATTLIST subdivn
    id
        CDATA
        #IMPLIED
    next-id
        CDATA
        #IMPLIED
>
```

TABLE 7

```
<!--
##################################################################
    ELEMENT:    desc
    PURPOSE:    Defines the "description" of a level.
    ATTRIBUTES:
        %date-atts; - defines the start and end dates for this version
                    of the description.
##################################################################
-->
<!ELEMENT desc
    (#PCDATA | %refs; | %effect; | quote)*
>
<!ATTLIST desc
    %date-atts;
>
```

The DTD has been altered such that scoping is transferred from the higher level nodes to terminal nodes.

Figure 4:
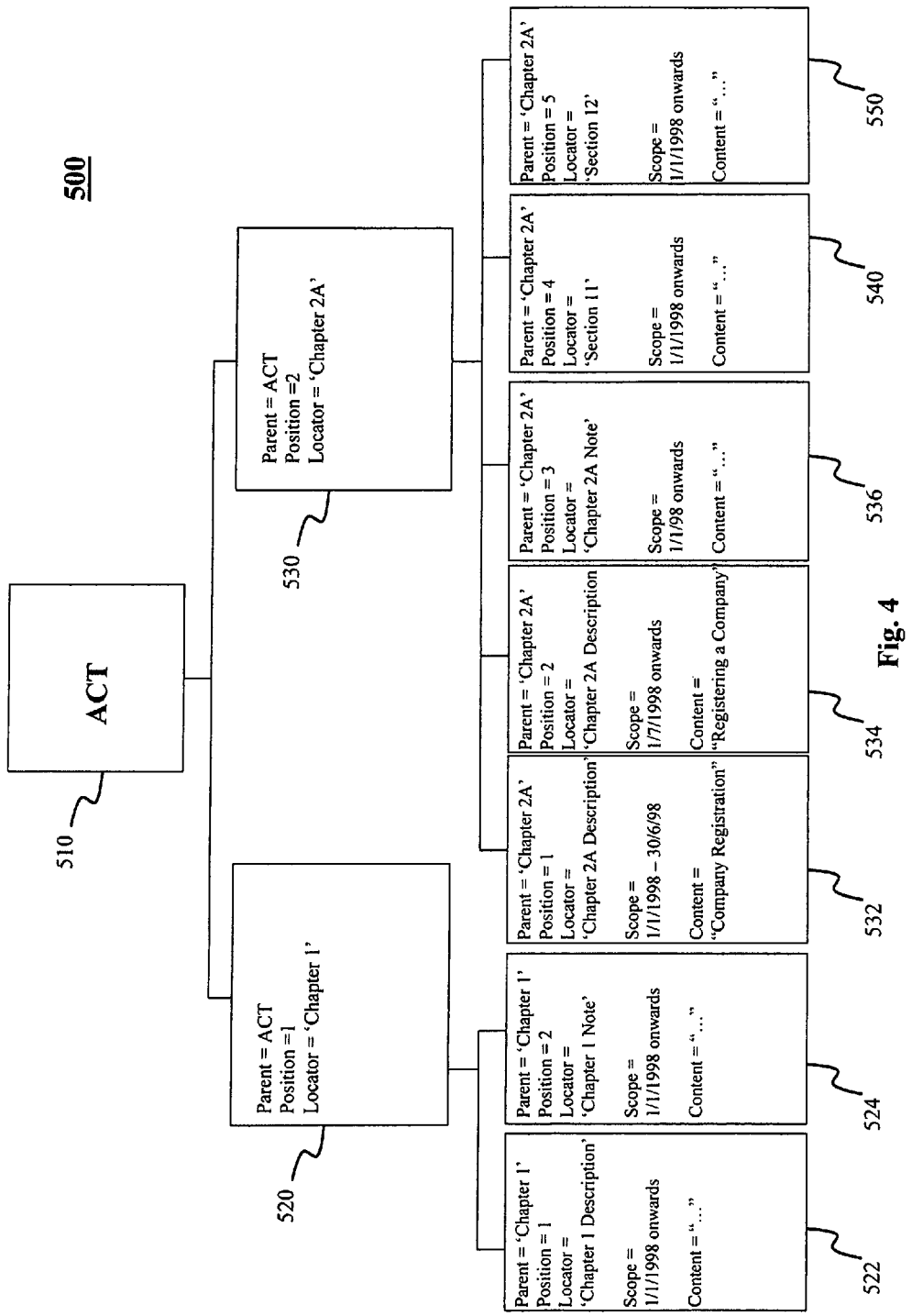
FIG. 4 is a block diagram representation of higher level scoping in accordance with an embodiment of the present invention.

Consider an example consisting of an Act with two chapters, the second chapter containing two sections, as shown by the system 500 of FIG. 4. A root node 510 represents the Act. The root node 510 has no parent, and all other nodes descend from the root node 510. The first chapter of the Act is represented by a higher level node 520. As a higher level node, node 520 has neither scope nor content. Node 520 has the following properties; a parent, being the Act node 510; a position within the parent node 510, being 1; and an optional locator, being "Chapter 1". Node 520 has two descendant nodes 522, 524. Node 522 has the following properties: a parent, being the node 520 identified by its locator "Chapter 1"; a position within the parent node 520, being 1; an optional locator, being "Chapter 1 Description"; scope, being 1 Jan. 1998 onwards; and content relating to the title or textual description of the first chapter of the Act under consideration. Node 524 has the following properties: a parent, being the node 520 identified by its locator "Chapter 1"; a position within the parent node 520, being 2; an optional locator, being "Chapter 1 Note"; scope, being 1 Jan. 1998 onwards; and content providing general notes or comments pertaining to the first chapter of the Act under consideration.

A second higher level node 530 represents the second chapter of the Act. Node 530 has two sections. Node 530 has the following properties: parent, being the Act node 510; a position within the parent node 510, being 2; and an optional locator, being "Chapter 2A". Node 530 has five child nodes: 532, 534, 536, 540 and 550, each of which is a terminal node in this example. Node 532 has the properties: parent, being Chapter 2A; a position within the parent, being 1; an optional locator, being "Chapter 2A description"; scope, being 1 Jan. 1998-30 Jun. 1998; and content, being "Company Registration". Node 534 has the properties: parent, being Chapter 2A; a position within the parent, being 2; an optional locator, being "Chapter 2A description"; scope, being 1 Jul. 1998 onwards; and content, being "Registering a Company". Node 536 has the properties: parent, being Chapter 2A; a position within the parent, being 3; an optional locator, being "Chapter 2A note"; scope; and content. Node 540 has the properties: parent, being Chapter 2A; a position within the parent, being 4; an optional locator, being "Section 11"; scope; and content. Node 550 has the properties: parent, being Chapter 2A; a position within the parent, being 5; an optional locator, being "Section 12"; scope; and content.

The different scopes of nodes 532 and 534 allow nodes 532, 534 to co-exist, without overlapping. Nodes 532, 534 may share the same locator, but the combination of locator and scope uniquely identifies the nodes. Nodes 532, 534 reflect the amendment of the title of Chapter 2A from "Company Registration" to "Registering a Company". The scopes of nodes 532, 534 indicate that the amendment came into effect on 1 Jul. 1998. In accordance with a further embodiment, higher level scoping is extended to facilitate commentaries, subject indices and similar material. When considering legislation, any amendment results in the production of a modified portion. However, when considering commentaries, two types of amendment to the commentary are possible. In the first scenario, corresponding to the legislation example, the scope of the current predefined portion of commentary is terminated and a new predefined portion is provided. The new predefined portion has a scope commencing on the day after the expiration of the current predefined portion. In the second possible scenario, the current predefined portion of the commentary is amended without a second predefined portion being created.

Figure 5A:
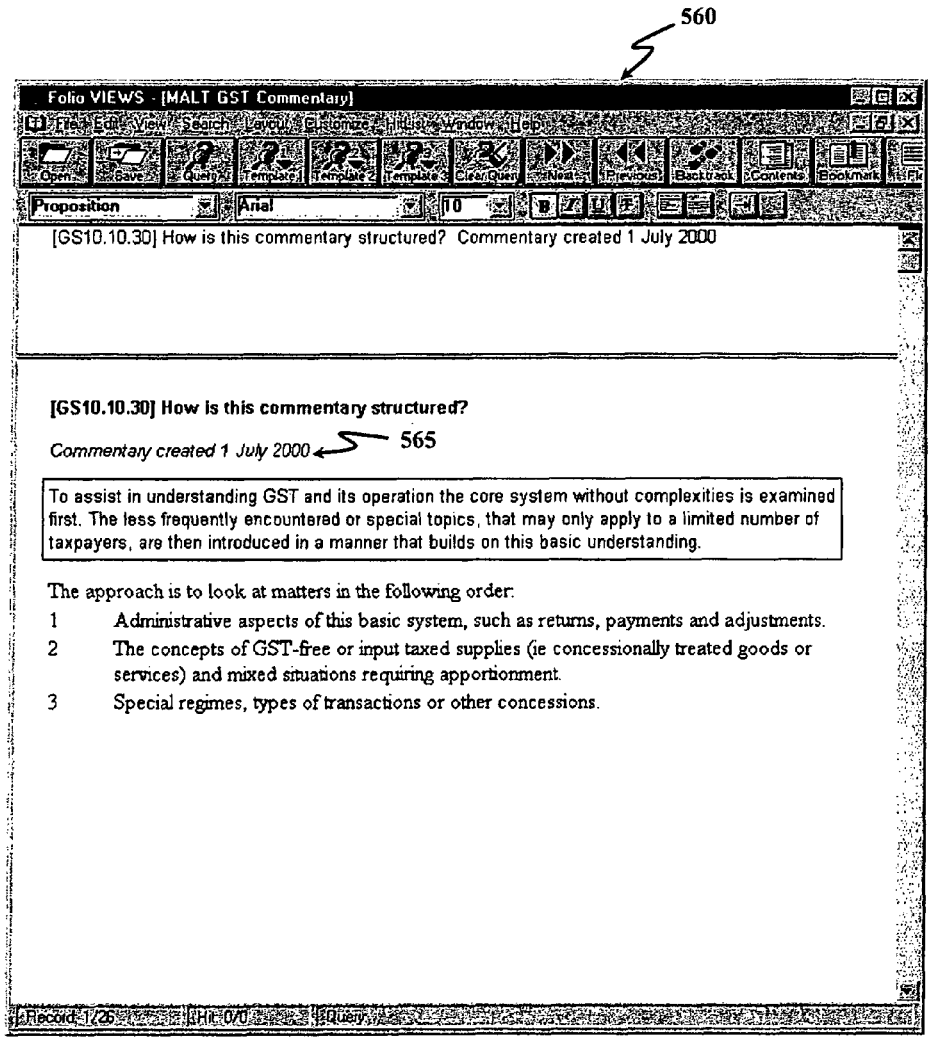
FIGS. 5A, 5B and 5C are screen shots illustrating a commentary in accordance with a further embodiment of the invention.
Figure 5B:
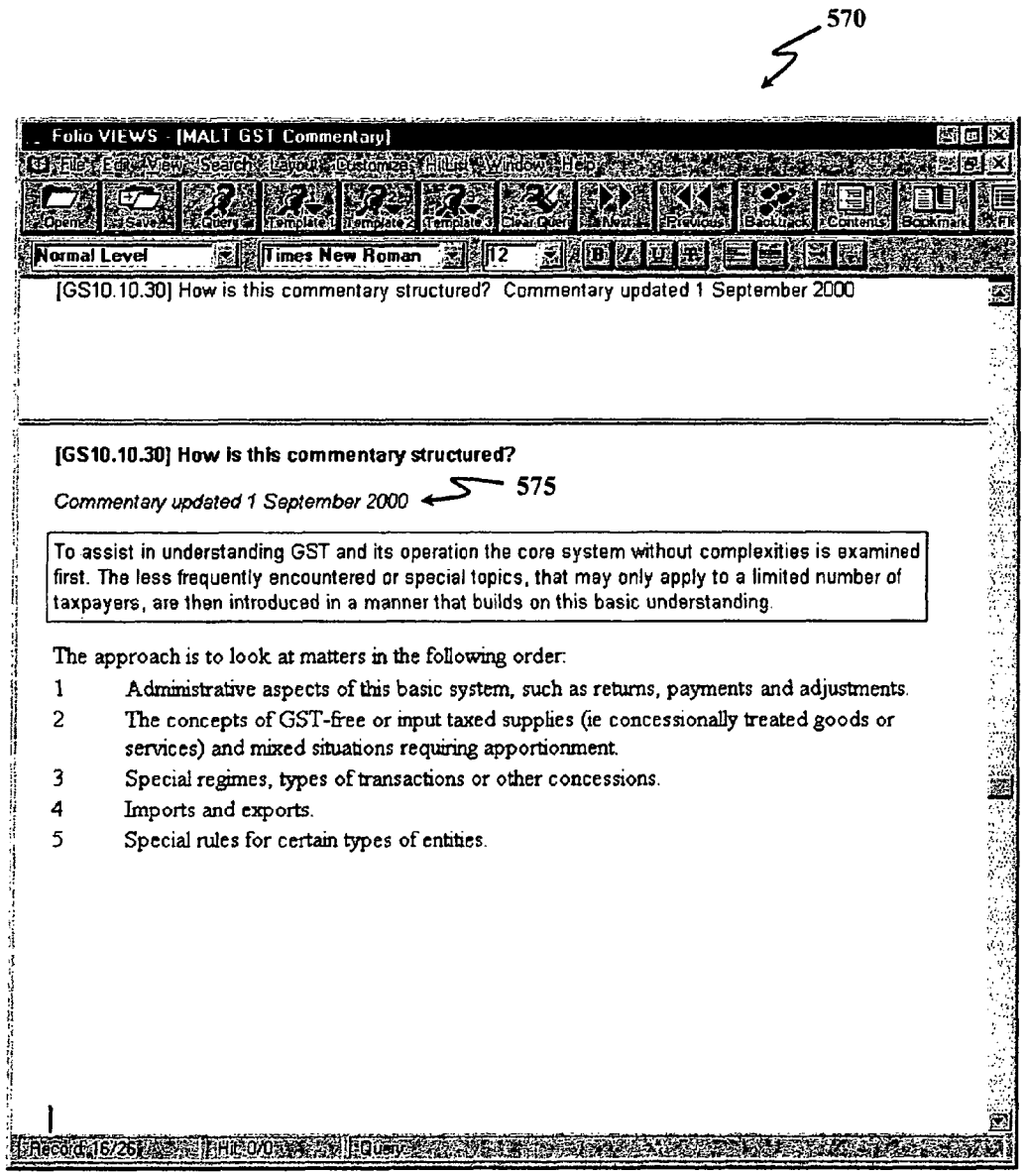
Figure 5C:
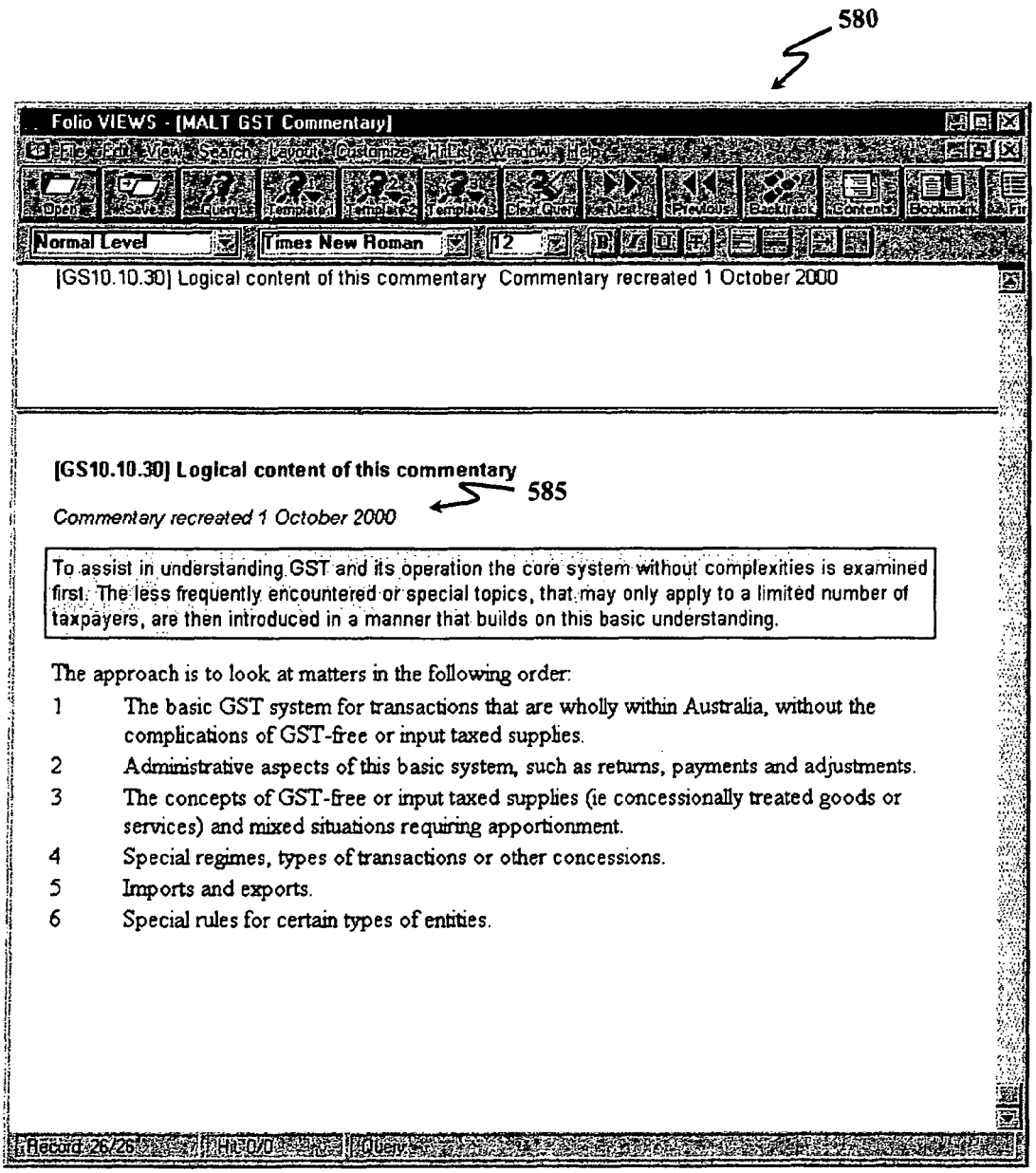

The scope of commentary portions is extended to include three dates: a start date, an update date and an end date. Referring to FIG. 5A, a screen shot 560 shows a commentary. The commentary was created on 1 Jul. 2000, as seen from the amendment bar 565. The commentary has the following scope properties: start date of 1 Jul. 2000, no update date and no end date. FIG. 5B shows a screen shot 570 of the commentary of FIG. 5A at a later date. The amendment bar 575 indicates that the commentary was last updated on 1 Sep. 2000. Thus, the scope of the commentary now has a start date of 1 Jul. 2000, an update date of 1 Sep. 2000 and no end date. FIG. 5C shows a further screen shot 580 of the commentary of FIGS. 5A and 5B at a yet later date. The amendment bar 584 indicates that at least one further amendment has been applied to the commentary since the update of 1 Sep. 2000 indicated at 575 in FIG. 5B. The amendment bar 585 of FIG. 5C shows that the last update date of the commentary is 1 Oct. 2000. Therefore, the scope properties of the commentary now read. First portion: start date of 1 Jul. 2000, end date of 30 Sep. 2000; Second portion: start date of 1 Oct. 2000, and no end date.

In a further embodiment, XML data may be divided into predefined portions and stored as a collection of flat files. In an example, the fat files take the form of a relational database. There is a one to one correspondence between the XML data and the relational database. The hierarchy of the XML data is expressed via the implementation of higher level scoping. A single reward is provided with an identifier and other terminal nodes are provided in which to store the remainder of the information.

Figure 6:
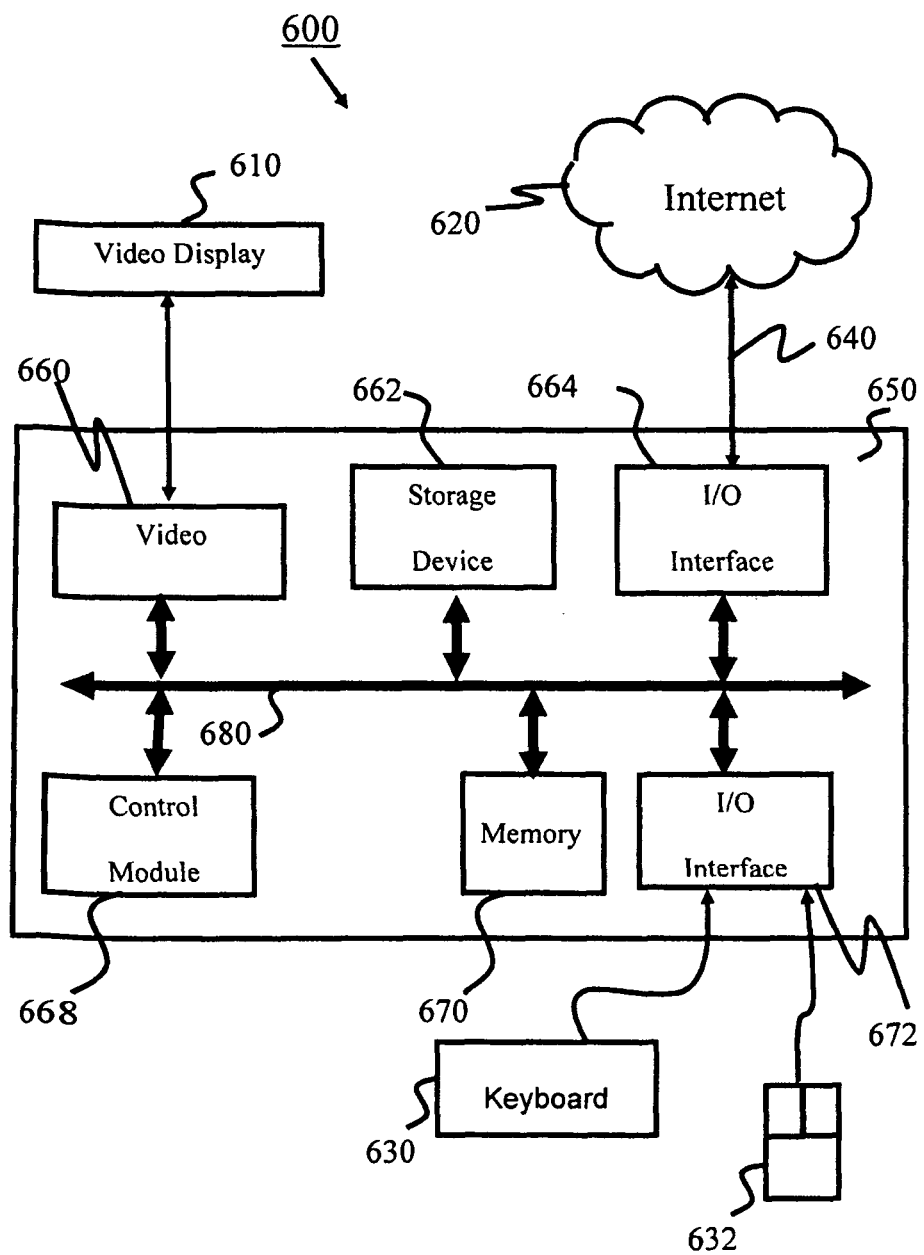
FIG. 6 is a computer program product block diagram.

The process for navigating in a multidimensional space containing an electronic publication formed firm predefined portions of text-based data encoded using a markup language can be implemented using a computer program product in conjunction with a computer system 600 as shown in FIG. 6. In particular, the process for navigating in a multidimensional space containing an electronic publication formed from predefined portions of text-based data encoded using a markup language can be implemented as software, or computer readable program code, executing on the computer system 600.

Similarly, the process for publishing an electronic publication formed from predefined portions of text-based data encoded using a markup language may also be implemented using a computer program product in conjunction with the computer system 600 shown in FIG. 6.

The computer system 600 includes a computer 650, a video display 610, and input devices 630, 632. In addition, the computer system 600 can have any of a number of other output devices including line printers, laser printers, plotter, and other reproduction devices connected to the computer 650. The computer system 600 can be connected to one or more other computers via a communication input/output (I/O) interface 664 using an appropriate communication channel 640 such as a modem communications path, an electronic network, or the like. The network may include a local area network (LAN), a wide area network (WAN), an Intranet and/or the Internet 620.

The computer 650 includes the control module 668, a memory 670 that may include random access memory (M and read-only memory (ROM), input/output (I/O) interfaces 664, 672, a video interface 660, and one or more storage devices generally represented by the storage device 662. The control module 668668 is implemented using a central processing unit (CPU) that executes or runs a computer readable program code that performs a particular function or related set of functions.

The video interface 660 is connected to the video display 610 and provides video signals from the computer 650 for display on the video display 610. User input to operate the computer 650 can be provided by one or more of the input devices 630, 632 via the I/O interface 672. For example, a user of the computer 650 can use a keyboard as I/O interface 630 and/or a pointing device such as a mouse as I/O interface 632. The keyboard and the mouse provide input to the computer 650. The storage device 662 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 650 is typically connected to other devices via a bus 680 that in turn can consist of data, address, and control buses.

The method steps for navigating in a multidimensional space containing an electronic publication formed from predefined portions of text-based data encoded using a markup language are effected by instructions in the software that are carried out by the computer system 600. Again, the software may be implemented as one or more modules for implementing the method steps.

In particular, the software may be stored in a computer readable medium, including the storage device 662 or that is downloaded from a remote location via the interface 664 and communications channel 640 from the Internet 620 or another network location or site. The computer system 600 includes the computer readable medium having such software or program code recorded such that instructions of the software or the program code can be carried out. The use of the computer system 600 preferably effects advantageous apparatuses for navigating a multidimensional space containing an electronic publication formed from predefined portions of text based data encoded using a markup language and for publishing an electronic publication formed from predefined portions of text based data encoded using a markup language in accordance with the embodiments of the invention.

The computer system 600 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a bard disk drive as the computer readable medium, and read and controlled using the control module 668. Intermediate storage of the program code and any data including entities, tickets, and the like may be accomplished using the memory 670, possibly in concert with the storage device 662.

In some instances, the program may be supplied to the user encoded on a CD-ROM or a floppy disk (both generally depicted by the storage device 662), or alternatively could be read by the user from the network via a modem device connected to the computer 650. Still further, the computer system 600 can load the software from other computer readable media. This may include magnetic tape, a ROM or integrated circuit, a magneto-optical disk, a radio or infra-red transmission channel between the computer and another device, a computer readable card such as a PC card, and the Internet 620 and Intranets including email transmissions and information recorded on Internet sites and the like. The foregoing are merely examples of relevant computer readable media. Other computer readable media may be practised without departing from the scope and spirit of the invention.

The process for navigating in a multidimensional space containing an electronic publication formed from predefined portions of text-based data encoded using a markup language can be realised in a centralised fashion in one computer system 600, or in a distributed fashion where different elements are spread across several interconnected computer systems.

The process for publishing an electronic publication formed from predefined portions of text-based data encoded using a markup language may also be implemented using a computer program product in conjunction with the computer system 600 of FIG. 6 in a manner similar to that which has just been described.

Computer program modules or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for navigating in a multidimensional space containing an electronic publication formed from predefined portions of text-based data encoded using a markup language are disclosed. Further, a method, an apparatus, and a computer program product for publishing an electronic publication formed from predefined portions of text-based data encoded using a markup language are disclosed. While only a small number of embodiments are described, it will be apparent to those skilled in the art in view of this disclosure that numerous changes and/or modifications can be made without departing from the scope and spirit of the invention.

INDUSTRIAL APPLICABILITY

It is apparent from the above that the arrangements described are applicable to the electronic publishing industry.

The foregoing describes only some embodiments of the present invention, and modifications and/or changes can be made thereto without departing from the scope and spirit of the invention, the embodiments being illustrative and not restrictive.

The invention claimed is:

1. A method of navigating in a multidimensional space containing an electronic publication comprising a plurality of predefined portions comprising text-based data and at least one modified predefined portion comprising text-based data, said method comprising:

causing the display of at least one of said plurality of predefined portions as a first predefined portion in a first display region, said first predefined portion comprising text-based data and being associated with at least one link, wherein said first predefined portion is stored and, if said first predefined portion has been modified, such modified predefined portion also being stored, wherein said first predefined portion corresponds to a first point on a primary first axis of said multidimensional space;

utilizing or causing utilization of information related to said first predefined portion to allow navigation on the first axis or a second axis to a second predefined portion related to said first predefined portion; and causing the display of information corresponding to a second point or a plurality of points of said first axis or second axis wherein said first predefined portion is selected based, at least in part, on the usability and structure of the electronic information.

2. The method according to claim 1, further comprising:
allowing the display of information corresponding to any number of points, and any number of axes related to said first point.

3. The method according to claim 2, for navigating among points, axes or both, and for returning to said first point if required.

4. The method according to claim 1, wherein said first point is a single point on said first axis of said multidimensional space.

5. The method according to claim 1, wherein said first predefined portion is a provision of legislation.

6. The method according to claim 1, wherein causing the display comprises providing a signal that at least in part causes such display.

7. An apparatus for navigating in a multidimensional space containing an electronic publication comprising a plurality of predefined portions comprising text-based data and at least one modified predefined portion of comprising text-based data, said apparatus comprising:

a server computer for causing the display of at least one of said plurality of predefined portions as a first predefined portion in a first display region, first predefined portion comprising text-based data and being associated with at least one link, wherein said first predefined portion is stored and, if said first predefined portion has been modified, such modified predefined portion also being stored, wherein said first predefined portion corresponds to a first point on a first axis of said multidimensional space;

a server computer for utilizing or causing utilization of information related said first predefined portion to allow navigation on said first axis or a second axis to a second predefined portion related to said first predefined portion; and a server computer for causing the display of information corresponding to a second point or a plurality of points of said first axis or second axis wherein said first predefined portion is selected based, at least in part, on the usability and structure of the electronic information.

8. The apparatus according to claim 7, further comprising:
allowing the display of information corresponding to any number of points; and any number of axes derived from said first point.

9. The apparatus according to claim 8, further comprising:
an interface of allowing navigation among points, axes or both, and returning to said first point if required.

10. The apparatus according to claim 7, wherein said first point is a single point on said first axis of said multidimensional space.

11. The apparatus according to claim 7, wherein said first predefined portion is a provision of legislation.

12. The apparatus according to claim 7, wherein causing the display comprises providing a signal that at least in part causes such display.

13. A computer program product having a non-transitory computer readable medium having a computer program recorded therein for navigating in a multidimensional space containing an electronic publication comprising a plurality of predefined portions comprising text-based data and at least one modified predefined portion comprising text-based data, said computer program product comprising:

computer program code for causing the display of at least one of said plurality of predefined portions as a first predefined portion in a first display region, said first predefined portion comprising text-based data and being associated with at least one link, wherein said first predefined portion is stored and, if said first predefined portion has been modified, each such modified predefined portion also being stored, wherein said first predefined portion corresponds to a first point on a first axis of said multidimensional space;

computer program code for utilizing or causing utilization of information related to said first predefined portion to allow navigation on said first axis or a secondary second axis to a second predefined portion related to said first predefined portion; and computer program code for causing the display of information corresponding to a second point or a plurality of points of said first axis or second axis;

wherein said first predefined portion is selected based, at least in part, on the usability and structure of the electronic information.

14. The computer program product according to claim 13, allowing the display of information corresponding to any number of points, and any number of axes related to said first point.

15. The computer program product according to claim 14, further comprising:

computer program code for navigating among points, axes or both, and for returning to said first point if required.

16. The computer program product according to claim 13, wherein said first point is a single point on said first axis of said multidimensional space.

17. The computer program product according to claim 13, wherein said first predefined portion is a provision of legislation.

18. The computer program product according to claim 13, wherein causing the display comprises providing a signal that at least in part causes such display.

\* \* \* \* \*